US012450241B2

United States Patent
Newman et al.

(10) Patent No.: US 12,450,241 B2
(45) Date of Patent: *Oct. 21, 2025

(54) SEMANTIC ENTITY SEARCH USING VECTOR SPACE

(71) Applicant: Wells Fargo Bank, N.A., San Francisco, CA (US)

(72) Inventors: David Newman, Walnut Creek, CA (US); Omar B. Khan, Richmond, VA (US); Alexander Joseph Kalinowski, Philadelphia, PA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/910,952

(22) Filed: Oct. 9, 2024

(65) Prior Publication Data

US 2025/0036635 A1 Jan. 30, 2025

Related U.S. Application Data

(63) Continuation of application No. 18/365,075, filed on Aug. 3, 2023, now Pat. No. 12,147,433, which is a continuation of application No. 17/646,228, filed on Dec. 28, 2021, now Pat. No. 11,768,837.

(51) Int. Cl.
*G06F 16/242* (2019.01)
*G06F 16/2457* (2019.01)
*G06N 5/02* (2023.01)

(52) U.S. Cl.
CPC .... *G06F 16/24575* (2019.01); *G06F 16/2423* (2019.01); *G06N 5/02* (2013.01)

(58) Field of Classification Search
CPC .. G06F 16/24575; G06F 16/2423; G06N 5/02
See application file for complete search history.

(56) References Cited

U.S. PATENT DOCUMENTS

2019/0087732 A1 3/2019 Park et al.
2022/0101153 A1 3/2022 Hubauer

OTHER PUBLICATIONS

"U.S. Appl. No. 18/634,035, Notice of Allowance mailed Feb. 26, 2025", 5 pgs.

(Continued)

*Primary Examiner* — Jorge A Casanova
(74) *Attorney, Agent, or Firm* — SCHWEGMAN LUNDBERG & WOESSNER, P.A.

(57) ABSTRACT

A method may include storing a vector space representation of a set of concepts in a semantic ontology, wherein locations of the set of concepts in the vector space are based on weights of a neural network trained using triples from the semantic ontology; presenting a semantic search user interface including: a text input portion to receive a search query from an input device; a suggested search portion; and a search results portion; receiving, from a user computing device, the search query; converting, using at least one processor, the search query into a vector; computing, using the at least one processor, a set of possible concepts related to the search query based on a distance between the vector and other concepts in the vector space representation; and presenting the set of possible concepts related to the search query in the suggested search portion of the semantic search user interface.

20 Claims, 14 Drawing Sheets

(56) References Cited

OTHER PUBLICATIONS

"U.S. Appl. No. 18/532,366, Notice of Allowance mailed Mar. 5, 2025", 8 pgs.
"U.S. Appl. No. 18/634,035, PTO Response to Rule 312 Communication mailed Apr. 17, 2025", 2 pgs.
"U.S. Appl. No. 18/365,075, Non Final Office Action mailed Apr. 22, 2024", 10 pgs.
"U.S. Appl. No. 18/365,075, Response filed Jun. 13, 2024 to Non Final Office Action mailed Apr. 22, 2024", 9 pgs.
"U.S. Appl. No. 18/532,366, Examiner Interview Summary mailed Jan. 31, 2025", 2 pgs.
"U.S. Appl. No. 18/532,366, Non Final Office Action mailed Dec. 30, 2024", 21 pgs.
"U.S. Appl. No. 18/532,366, Response filed Feb. 5, 2025 to Non Final Office Action mailed Dec. 30, 2024", 11 pgs.
"U.S. Appl. No. 18/634,035, Non Final Office Action mailed Dec. 18, 2024", 13 pgs.
"U.S. Appl. No. 18/634,035, Response filed Jan. 16, 2025 to Non Final Office Action mailed Dec. 18, 2024", 8 pgs.

SEMANTIC ENTITY SEARCH USING VECTOR SPACE

RELATED APPLICATION

This application is a continuation of U.S. Ser. No. 18/365,075, filed Aug. 3, 2023, which is a continuation of U.S. Ser. No. 17/646,228, filed Dec. 28, 2021, now issued as U.S. Pat. No. 11,768,837. This application relates to application Ser. No. 16/230,879, filed Dec. 21, 2018, titled "User Interfaces for Database Visualizations," hereby incorporated by reference herein in its entirety.

BACKGROUND

Data may be expressed and stored in a number of ways. For example, consider a birthdate. The format of the birthdate may be dd-mm-yyyy, mm-dd-yyyy, yyyy-mm-dd, among many others. In a relational database system, organizations may store birthdates in many different instances in many different tables. Each one of the tables may use a different column label, such as "birthdate," "b-date," etc. Accordingly, a data scientist (or a computer program) collecting all of the birthdates in a system would need to know not only the different formats that were used, but also each table where a birthdate is stored and the column label for the birthdate.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawing.

FIG. 10 is a depiction of a set of tables in an RDBMS, according to various examples.

DETAILED DESCRIPTION

Figure 1:
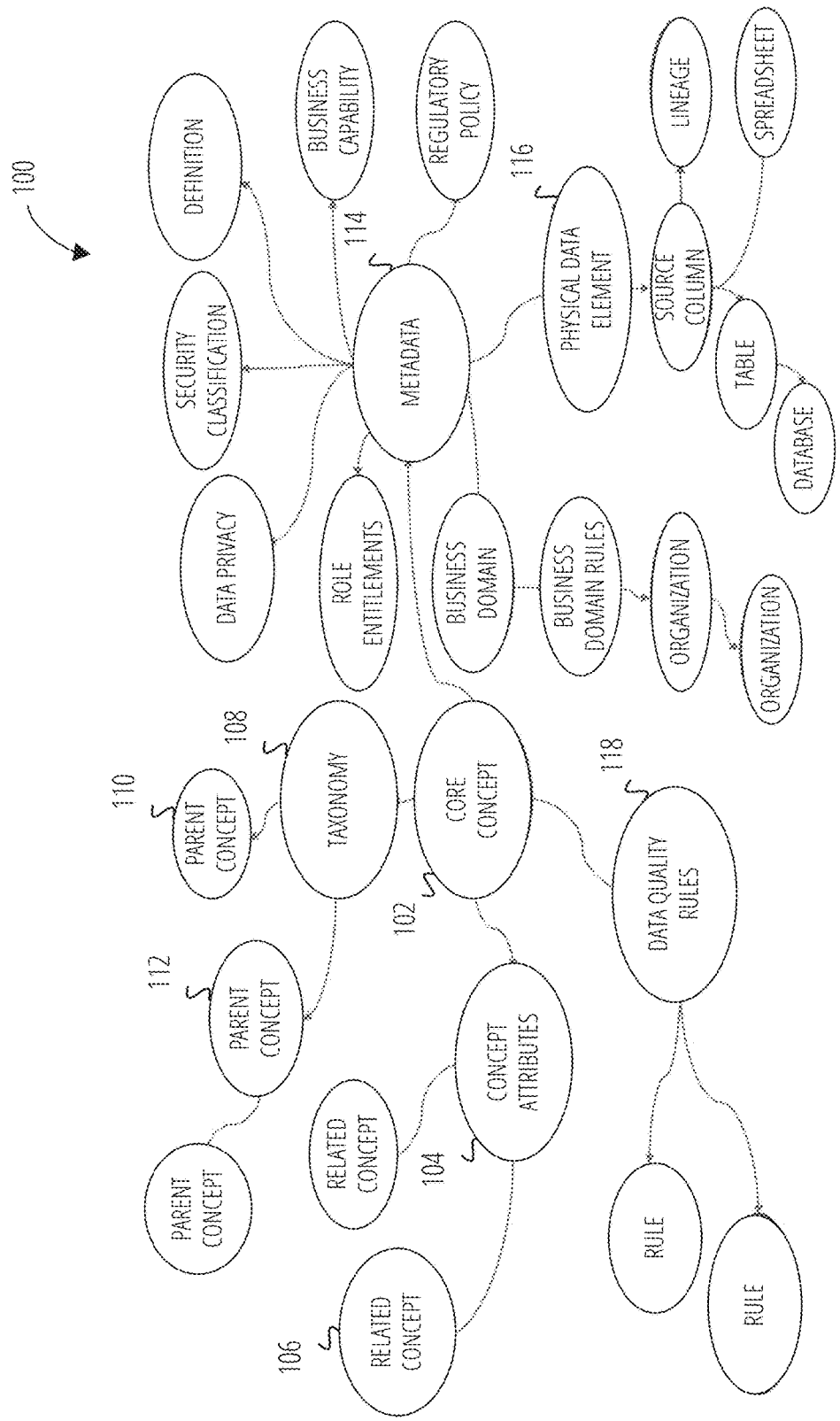
FIG. 1 is a conceptual illustration of parts of a data model, according to various examples.

In the following description, for purposes of explanation, numerous specific details are set forth in order to provide a thorough understanding of some example embodiments. It will be evident, however, to one skilled in the art that the present invention may be practiced without these specific details.

Throughout this disclosure, electronic actions may be performed by components in response to different variable values (e.g., thresholds, user preferences, etc.). As a matter of convenience, this disclosure does not always detail where the variables are stored or how they are retrieved. In such instances, it may be assumed that the variables are stored on a storage device (e.g., Random Access Memory (RAM), cache, hard drive) accessible by the component via an Application Programming Interface (API) or other program communication method. Similarly, the variables may be assumed to have default values should a specific value not be described. User interfaces may be provided for an end-user or administrator to edit the variable values in some instances.

As discussed herein, any large organization that uses a relational database management system (RDBMS) will quickly come to find that running any type of data analysis becomes unwieldy or incomplete. This challenge becomes more and more difficult as the database system grows and/or the amount of data increases. One possible solution to this problem is to create a data model before any data is inputted into a database. However, this is an impractical solution for existing systems as legacy data would not necessarily conform to the data model. For example, it is likely that not all users (e.g., database administrators, data scientists, data modelers, etc.) within an organization will use agreed-to terminology for the data model in the future.

An additional problem with traditional data repositories, in general, is that incorrect or duplicate entries can be difficult or impossible to detect and/or correct. For example, a lot of the data that is put into a data repository is manually entered and comes from different sources. For example, consider a database that maintains a list of companies, their addresses, and their phone numbers. One data entry may be for "Bob's Auto Body" at "123 Main St." and another for "Bobs Auto Body Shop" at "123 Main Street." Accordingly, it is fairly likely that these two entries are for the same business.

As such, maintaining the two entries can create a number of problems. First, data repositories are not "free" in the sense that they consume resources and have a storage capacity. Thus, duplicate entries consume disk space and require additional time to complete queries (due to the need to search more data). Second, data analytics executed for the data repository will be inaccurate. For example, if a data scientist queries the data repository for the total number of businesses, the count will be wrong. Similarly, if the data scientist queries the data repository for the total number of "auto" businesses, the number of results will be wrong. Finally, if a user is searching for a specific autobody shop entity, they may not know which of the "auto" results is correct or not be aware that they are the same entity.

Another type of data repository is a graph database-often used with a semantic ontology. A semantic ontology may be a taxonomy of concepts for a given field-different fields may use different ontologies. The ontology may identify types (e.g., concept objects), properties, and interrelationships between the objects. In some examples, the definition of an ontology is described and stored as a schema at a network-accessible uniform resource identifier (URI).

A graph database may be used for storing a representation of an ontology. Nodes of the database may represent objects, edges may connect the nodes to indicate a relationship, and properties may indicate information about the edges and nodes. A triplestore (sometimes referred to a resource description framework (RDF) store) is a type of graph database often used for semantic data that conforms to the subject-predicate (or property)-object format.

As an example, consider a schema for a Person object. The schema may include a number of entries that define the properties (sometimes referred to as relationships, slot-value types) of a Person object such as "given name," "height," "weight," etc., and the properties may also have expected types. Thus, the "height" property may have a value-type of a number whereas "given name" has a string value type. The expected type of an object may be another object. For example, a property of "knows" may have an expected type of Person. Accordingly, the data string "Alice knows Bob" can be thought of as two Person objects with the Alice having the "knows" property. In another example, a Business object may have properties of an address, a legal name, and a phone number.

Another way to consider ontologies is using a "Subject, Predicate, Object" (S-P-O) format. Using the example of "Alice knows Bob," Alice is the subject, the predicate is "knows," and the object is "Bob." With reference back to the example Person schema, the predicate is the property in the schema and the expected type is the object. In other words, a schema may semantically define valid relationships between multiple objects.

A user may search for objects in an ontology or for the schema of the ontology itself. For example, a user may search for "Person" to retrieve the Person object and have the properties of the Person object presented. The Person object may also have a parent object and child objects. An ontology may be structured as a directed acyclic graph and stored in a graph database. Each node in the directed acyclic graph may represent a concept object in the ontology. A concept object may have a "is a" direct property relationship to one or more other concept objects that are represented as vertices in the directed acyclic graph. If concept object B "is a" concept object A, then concept object B may be considered a subclass of concept object B. Similarly, concept object A may be a superclass concept object of concept object B. The relationships and concept objects may be stored in a graph database. Properties from a superclass of a concept object may be inherited to the concept object.

A concept object may also be semantically related to other concept objects or attributes. Unlike direct "is a" relationship, semantically related objects do not automatically inherit properties from their semantic links. For example, a Person object may have a property of "works for" a Company object, but the Person object may not inherit properties of the Company object.

Searching for a particular type of data within an organization has its own challenges-even when the data is available. One challenge is to effectively help find what a user is looking for. A second challenge is helping to enable the user to understand the results.

One purpose of metadata repositories is to give clarity on the type of physical data elements that exist to fulfill a particular business need (e.g., find database tables that include confidential information). Past solutions generally relied on a user logging into a proprietary vendor product but are often incomplete. For example, definitions or descriptions of assets may have to be entered manually. Quite often, the entries are de minimis such that the definitions are incomplete, incorrect, or not up to date. This may be because certain information models that are in one proprietary source are segregated from other metadata repositories.

Because of these deficiencies, users have a difficult time searching the metadata repositories as there is no guidance or taxonomies (e.g., semantic linkages) available to the user. Accordingly, there is no mechanism for a user to search using broad questions and actually find the relevant information as a result. These deficiencies also lead to stunting development of analytical tools that may make use of the data because the underlying data is unorganized, potentially inaccurate, and often incomplete. For example, a data security scientist that is looking for what data sources include confidential information may be unable to find the relevant information. Furthermore, data scientists may need to perform data wrangling—an intensive, often manual, process of standardizing data in order to perform analytics—to begin their work.

The problems above mainly stem from the fact that there is no central model that links and integrates the physical data elements (often highly disparate) that exists for an organization. Without this model, there can be no way to ask questions that result in a complete, contextualized set of data. As described in more detail herein, a solution to the myriad of problems may include improvements to (and use of), many technological fields, including, but not limited to, user interface design, user interaction models, data storage models, data translation, data searching, and neural networks. As a summary, the process and system described herein provides a central nervous system across data sources that permits a user to search and explore data relationships in a data repository according to a semantic model.

FIG. 1 is a conceptual illustration of parts of a data model 100, according to various examples. The data model 100 includes, as illustrated, a core concept 102, attributes 104, a related concept 106, a taxonomy 108, a parent concept 110, a parent concept 112, a metadata 114, a physical data element 116, and data quality rules 118.

A core concept 102 may have concept attributes 104 that link to a related concept 106. A core concept 102 may be a concept of an ontology. For example, core concept 102 may be an identifier concept. And an identifier may provide a way to identify different related concepts. Thus, an attribute of attributes 104 may be "can identify" or "is an identifier for" and related concept 106 may be a credit card account identified by the identifier.

Core concept 102 may be part of taxonomy 108 that includes different levels of a concept. For example, consider that core concept 102 is a commercial credit card account. The commercial credit card account may be a type of credit card account (e.g., parent concept 110) which is a type of account (e.g., parent concept 112).

Metadata 114 may be attached to core concept 102. As illustrated, metadata 114 may be of a number of types—including, but not limited to, role entitlements, data privacy, security classification, definition, business capability, regulatory/policy metadata, business domain, business domain roles, and organizations. Role entitlements may define who can, and at what level of specificity, see and edit a concept and its associated metadata. For example, someone with full access (e.g., the concept owner) may be able to see the concept all links to the concepts in production. In contrast, someone with lesser access may not be able to see all the metadata for the concept.

The data privacy metadata may indicate whether a concept is related to data privacy. For example, in certain jurisdictions there are specific data privacy requirements. Thus, knowing which concepts relate to data privacy (e.g., the General Data Protection Regulation) may be important to ensure compliance with these requirements. In a similar manner, the security classification metadata may indicate a level of classification (e.g., public, confidential, etc.) for a concept. In some instances, a concept may not be classified on its own, but may be classified if combined with another concept. For example, a user's name may not be confidential, but their name and their social security number may be.

The definition may be a description of the concept. The business capability may indicate which parts of a business the concept supports. For example, a concept may be useful in determining risk management. Regulatory policy metadata may indicate how a concept's data needs to be managed when used with other concepts.

The metadata may also include information that defines a physical data element 116 associated with the concept. The physical data element 116 may indicate where in a database or datafile underlying data for the concept is stored. For example, consider core concept 102 is a commercial credit card account identifier. The physical data element 116 for that concept may link to a number of files, databases, and tables that all include a credit card account identifier; however, each physical data element may include a different label. For example, one table may label a column "identifier," and another may use "CC_identifier." Thus, each physical data element may equally include data for the concept of a commercial credit card account identifier-even though an underlying label may be different. Additionally, core concept 102 may include links to data quality rules 118. Data quality rules 118 may identify the type of data constraint rules for a concept.

In the past, each part of the model in FIG. 1 may be siloed off from another. For example, each type of metadata may be stored in a different location or with a different, independent proprietary vendor product; and the concept attributes 104 and taxonomy 108 may be stored separately from data quality rules 118, etc. Because of this, the parts of the model do not interoperate. As such, a user or program cannot ask questions of a data quality rule and linking it to a security classification.

Figure 2:
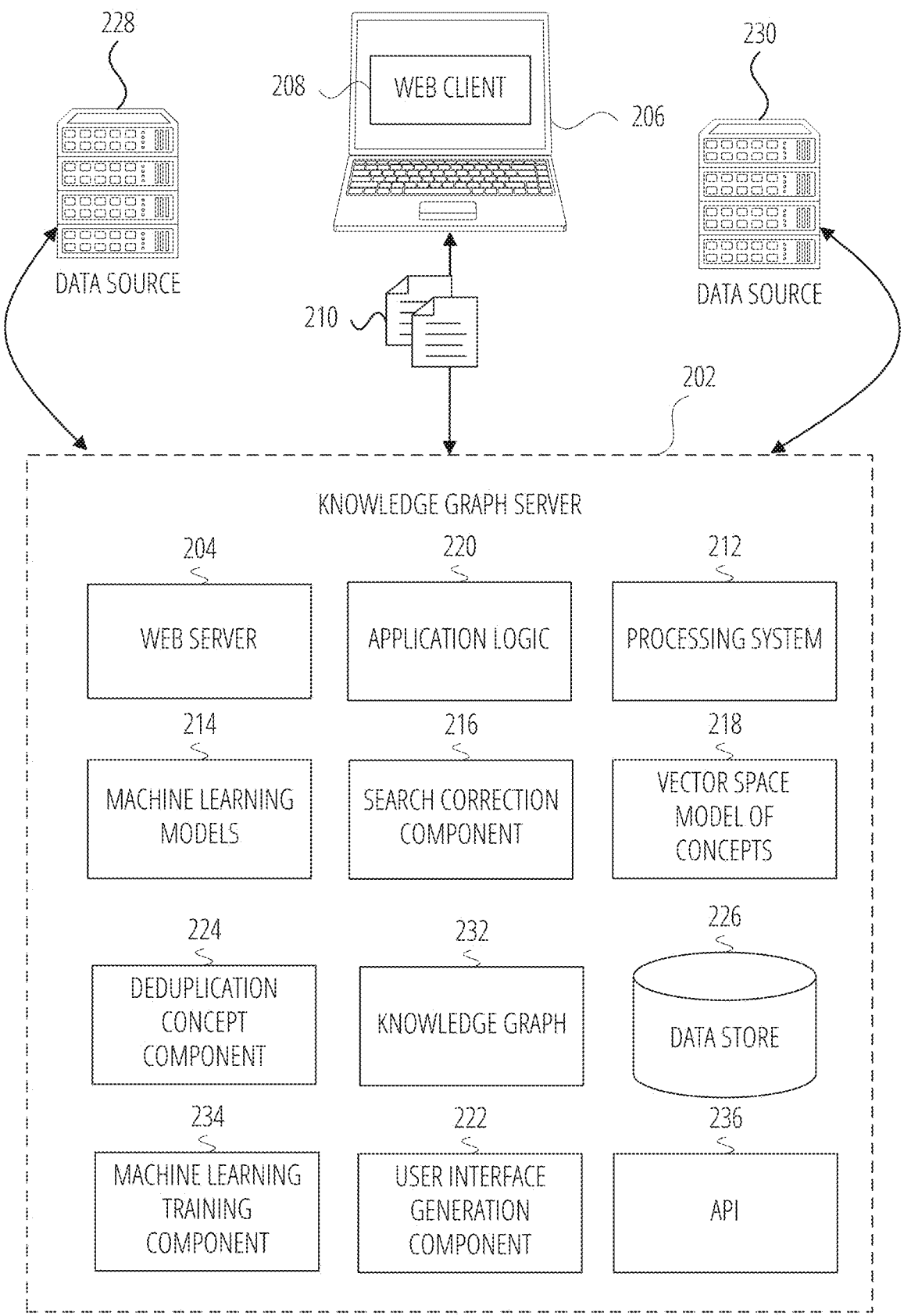
FIG. 2 is an illustration of components of a client device and an application server, according to various examples.

FIG. 2 is a diagram illustrating a schematic representation of components of a knowledge graph server 202, according to various examples. The system comprises a knowledge graph server 202, a web server 204, a client device 206, a web client 208, a data 210, a processing system 212, a machine learning models 214, a search correction component 216, a vector space model of concepts 218, an application logic 220, a user interface generation component 222, a deduplication concept component 224, a data store 226, a data source 228, a data source 230, a knowledge graph 232, a machine learning training component 234, and an API 236.

For illustration purposes, knowledge graph server 202 is illustrated as set of separate items (e.g., web server 204, search correction component 216, vector space model of concepts 218, etc.). However, the functionality of an individual items may be performed by a single component. A component may represent computer program code that is executable by a processing unit (e.g., a core of a general-purpose computer processor, a graphical processing unit, an application specific integrated circuit, etc.) of processing system 212. The program code may be stored on a storage device and loaded into a memory of the processing unit for execution. Portions of the program code may be executed in a parallel across multiple processing units. Execution of the code may be performed on a single device or distributed across multiple devices. In some examples, the program code is executed on a cloud platform (e.g., MICROSOFT AZURE® and AMAZON EC2®) using shared computing infrastructure.

Knowledge graph server 202 may be used to implement the processes described in this document. An overview of each of the components is provided in the context of this figure—additional detail is provided during the discussion of the remaining figures.

Client device 206 may be a computing device which may be, but is not limited to, a smartphone, tablet, laptop, multi-processor system, microprocessor-based or programmable consumer electronics, game console, set-top box, or other device that a user utilizes to communicate over a network. In various examples, a computing device includes a display module (not shown) to display information (e.g., in the form of specially configured user interfaces). In some embodiments, computing devices may comprise one or more of a touch screen, camera, keyboard, microphone, or Global Positioning System (GPS) device.

Client device 206 and knowledge graph server 202 may communicate via a network (not shown). The network may include local-area networks (LAN), wide-area networks (WAN), wireless networks (e.g., 802.11 or cellular network), the Public Switched Telephone Network (PSTN) Network, ad hoc networks, cellular, personal area networks or peer-to-peer (e.g., Bluetooth®, Wi-Fi Direct), or other combinations or permutations of network protocols and network types. The network may include a single Local Area Network (LAN) or Wide-Area Network (WAN), or combinations of LAN's or WAN's, such as the Internet.

Client device 206 and knowledge graph server 202 may communicate data 210 over the network. Data 210 may include a search request from a user for a particular concept in knowledge graph 232. Data 210 may also include the results of the search for rendering on web client 208.

In some examples, the communication may occur using an application programming interface (API) such as user interface generation component 222. An API provides a method for computing processes to exchange data. A web-based API (e.g., user interface generation component 222) may permit communications between two or more computing devices such as a client and a server. The API may define a set of HTTP calls according to Representational State Transfer (RESTful) practices. For examples, A RESTful API may define various GET, PUT, POST, DELETE methods to create, replace, update, and delete data stored in a database (e.g., data store 226).

Knowledge graph server 202 may include Web Server 204 to enable data exchanges with client device 206 via web client 208. Although generally discussed in the context of delivering webpages via the Hypertext Transfer Protocol (HTTP), other network protocols may be utilized by web server 204 (e.g., File Transfer Protocol, Telnet, Secure Shell, etc.). A user may enter in a uniform resource identifier (URI) into web client 208 (e.g., the INTERNET EXPLORER® web browser by Microsoft Corporation or SAFARI® web browser by Apple Inc.) that corresponds to the logical location (e.g., an Internet Protocol address) of web server 204. In response, web server 204 may transmit a web page that is rendered on a display device of a client device (e.g., a mobile phone, desktop computer, etc.).

Additionally, web server 204 may enable a user to interact with one or more web applications provided in a transmitted web page. A web application may provide user interface (UI) components that are rendered on a display device of client device 206. The user may interact (e.g., select, move, enter text into) with the UI components, and, based on the interaction, the web application may update one or more portions of the web page. A web application may be executed in whole, or in part, locally on client device 206. The web application may populate the UI components with data from external sources or internal sources (e.g., data store 226) in various examples. For example, a web application may be used to search and navigate knowledge graph 232 as depicted in FIG. 3, FIG. 4, FIG. 5A, and FIG. 5B.

The web application may be executed according to application logic 220. Application logic 220 may use the various elements of knowledge graph server 202 to implement the web application. For example, application logic 220 may issue API calls to retrieve or store data from data store 226 and transmit it for display on client device 206. Similarly, data entered by a user into a UI component may be transmitted using user interface generation component 222 back to the Web Server. Application logic 220 may use other elements (e.g., machine learning models 214, search correction component 216, vector space model of concepts 218, application logic 220, user interface generation component 222 etc.) of knowledge graph server 202 to perform functionality associated with the web application as described further herein.

Data store 226 may store data that is used by knowledge graph server 202. For example, knowledge graph 232 may be stored in data store 226 as a graph database. Data store 226 is depicted as singular element, but may in actuality be multiple data stores. The specific storage layout and model used in by data store 226 may take a number of forms-indeed, a data store 226 may utilize multiple models. Data store 226 may be, but is not limited to, a relational database (e.g., SQL), non-relational database (NoSQL) a flat file database, object model, document details model, graph database, shared ledger (e.g., blockchain), or a file system hierarchy. Data store 226 may store data on one or more storage devices (e.g., a hard disk, random access memory (RAM), etc.). The storage devices may be in standalone arrays, part of one or more servers, and may be located in one or more geographic areas.

Machine learning models 214 may include one or more machine learning models used by knowledge graph server 202 to determine search results for a user query. In some instances, the machine learning model itself is directly used but instead, the weights of the hidden layers are the basis for the coordinates in vector space model of concepts 218.

For example, a machine learning model (e.g., a semantic model) may be trained to find synonyms of concepts using the metadata of the concepts in the knowledge graph 232. A corpus of training data may be compiled by obtaining, for each concept object in an ontology, a concept label and annotations describing the concept object. A vocabulary of terms is generated based on the corpus of training data. For example, each unique word in the corpus of training data may be a term. In some examples, each concept label from the ontology is a term. In some examples, some words may be excluded from the vocabulary (e.g., "and"). The vocabulary may be generated according to an algorithm defined by a natural language processing algorithm or semantic model.

A semantic model is trained using the corpus of training data and the vocabulary of terms. The semantic model may be, but is not limited to, Word2Vec, GloVe, fastText, and conceptnumberbatch. Input features of the semantic model may be based on context words in proximity to a term in the vocabulary of terms. The limit of proximity may be defined according to a window of X words surrounding the term. Context may refer to word within the window. The format and number of input features may be defined as a parameter of the semantic model.

Training the semantic model may include using word pairs from the corpus of training data (e.g., using continuous bag of words or skip-gram), a first word of a word pair being an input and a second word of the word pair being an expected output. In various examples, each respective row of the weight matrix between the input layer and the single hidden layer of neurons is a respective word embedding of the set of word embeddings for a respective term in the vocabulary of terms.

A set of word embeddings for the vocabulary of terms is stored based on the trained semantic model. For example, each row of the weight matrix may be stored as a word embedding for the vocabulary of terms. An API may be defined that permits querying the stored word embedding for the closest term in the vocabulary given an input term. Closeness may be defined by the cosine similarity between two different word embeddings. The semantic model may be used to suggest alternate search terms to the user if a search string is not a direct match for a concept name.

Another machine learning model may be used to determine if two objects are actually duplicates, or share common data, of each other. For example, (as described in more detail in FIG. 8 to FIG. 12) the machine learning model may take as input knowledge graphs that were generated from data sources (e.g., data source 228 and data source 230). The result of the training (e.g., the weights of the nodes) may be coordinates for each concept in vector space that are stored in vector space model of concepts 218. When a user searches for one concept using client device 206, knowledge graph server 202 may retrieve other concepts that are close in vector space (e.g., using cosign similarity) to the searched for concept.

In various examples, deduplication concept component 224 may be used to find and merge concepts in knowledge graph 232. For example, API 236 may provide a function call that takes two concept names as input and returns a percentage chance the two concepts are duplicates based on their distance in vector space in vector space model of concepts 218 or an output of a model in machine learning models 214.

Figure 3:
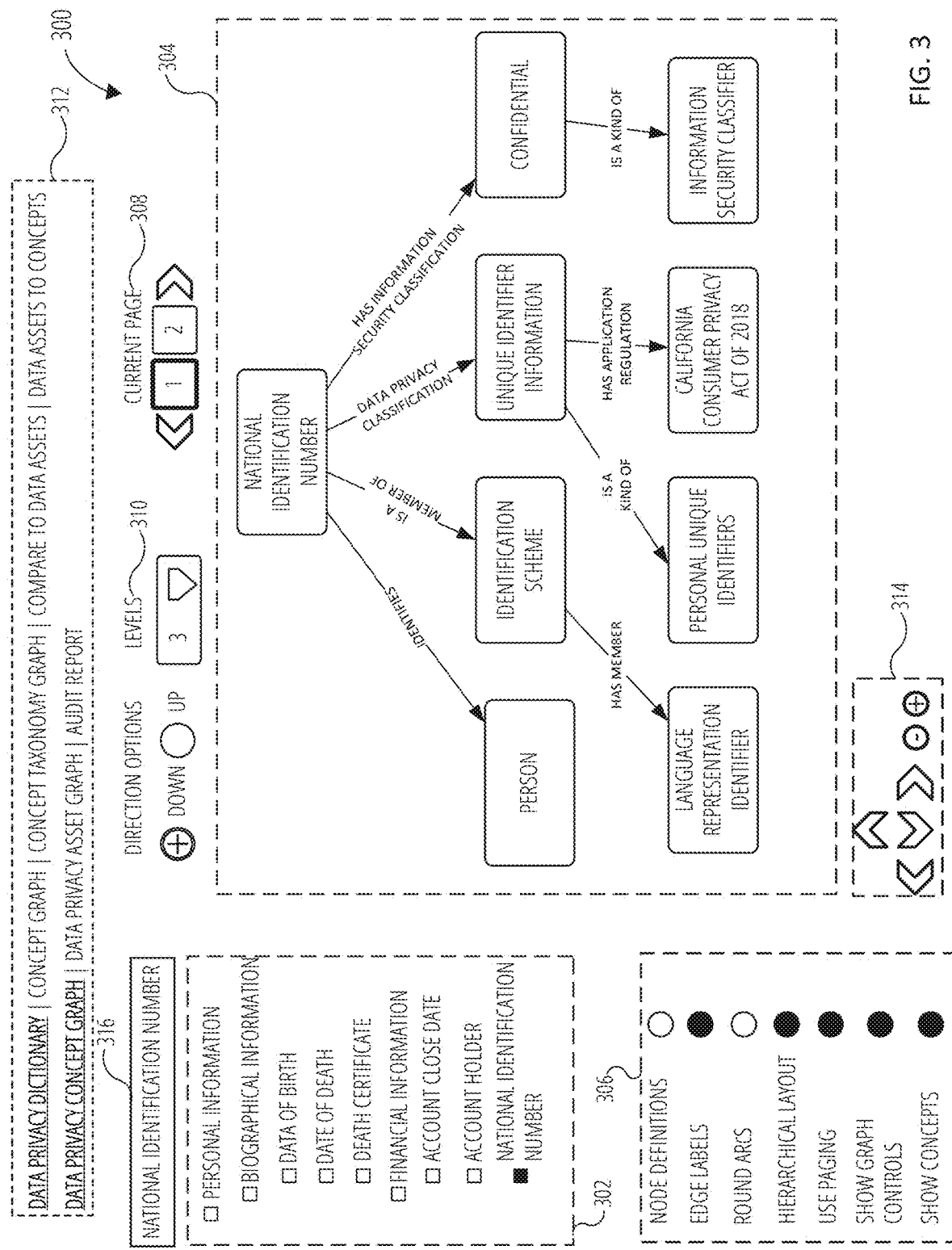
FIG. 3 is a user interface for exploring a knowledge graph data model, according to various examples.

FIG. 3 is a user interface 300 for exploring a knowledge graph data model, according to various examples. User interface 300 includes concepts list 302, visual graph 304, visualization options 306, paging control 308, level control 310, graph selection controls 312, graph navigation controls 314, and current concept 316. The source of the underlying knowledge graph data model may be a model such as depicted in FIG. 1 and stored as part of knowledge graph 232.

One of the deficiencies in traditional data catalogs is that lack of a taxonomy. In order to overcome this, existing domain-specific ontologies may be used as the basis for the taxonomy. For example, FIG. 3 illustrates an example catalog related to data privacy. Concepts from the catalog may be presented as concepts list 302. A user may select (e.g., click with an input device) a concept and have it expanded to see the topic's constituent concepts (if any). The number of and labeling of specific concepts in FIG. 3 are for illustration purposes. Accordingly, a data catalog for data privacy may have more or fewer concepts.

User interface 300 includes a number of portions for interacting and browsing the underlying data in the knowledge graph data model. For example, visualization options 306 include options for enabling/disabling a variety of user interface elements such as showing/hiding node definitions (described further below), edge labels (e.g., the "identifies" between national identification number and person), round arcs (e.g., instead of straight line connectors between concepts), hierarchical layout (in contrast, for example, a radial layout), paging (described further below), hiding/showing graph navigation controls 314, and hiding/showing concepts list 302.

Graph navigation controls 314 may be used to move, visually, through the presented graph. For example, when a graph is large, the results may be hard to read or take in all at once. Accordingly, the user may zoom in to a particular portion and use the arrows of graph navigation controls 314 to navigate around the graph while zoomed in to just a portion of it.

Paging may be used when a graph is too large to display—in a readable manner—all child nodes of a parent node. Each "page" may show a subset of the child nodes and a user may navigate (e.g., horizontally via paging control 308) through the pages to see the non-displayed child nodes. The parent node may still be displayed in each page, but the user may traverse through the child nodes by using the navigation arrows of paging control 308. When a user activates (e.g., clicks) one of the arrows, some or all of the current displayed child nodes may be replaced with currently non-displayed child nodes.

A user may select a particular concept within concepts list 302 to have visual graph 304 generated and presented in another portion of the user interface adjacent to concepts list 302. Generating the graph may include a processing unit formulating a query using the selected concept name as an input to a graph database (e.g., an RDF-based semantic model) to retrieve a set of results. The results may include parent or child nodes of the selected concept. The visual graph 304 may be generated using the results and any suitable graph visualization layout algorithm (e.g., dynamic distance between two nodes based on screen size, static distance between nodes, etc.). In various examples, the query may include a limit on the nodes returned when paging is used, as not all of the results will be displayed at once. This type of node limited query may increase the response time for generating the visualization in visual graph 304.

One property of semantic models is that of inheritance. Accordingly, a child concept (e.g., a class) of a parent concept (e.g., a superclass) will inherit all the properties of its parent. However, if a user is only viewing the direct, as opposed to inherited, properties of a concept the user may not be aware there are additional inherited properties. Accordingly, a flattened model may be used from the data to include in visual graph 304. The flattened model may place the inherited properties directly beneath the concept.

For example, consider a superclass of "account" that includes a "has an identifier" property. Now, consider that a credit card account concept is a subclass of "account." The credit card account concept, when visualized in a flattened model, would include an edge with a "has a" label between a "credit card account" vertex and an "identifier" vertex. Additionally, a flattened model may only include a subset of concepts of the overall model. For example, concepts that are used for internal data organization, but that are not relevant to data scientists, may not be included in the flattened model. The knowledge graph data model may include a property that indicates whether or not to include it as a flattened model.

The level control 310 may be used to set how many levels of a graph, with respect to a concept, should be shown. For example, when in a concept taxonomy view, selecting "up" retrieves superclass concept objects of the searched concept object, and selecting "down" retrieves the subclass concept objects of the searched concept. The value of the level slider determines how many levels of a graph to present. As illustrated, level '3' and "down" is selected. Accordingly, the first level is the concept itself, the second level is the subclasses of the concept (e.g., person, identification scheme), and the third level is subclasses of the second level. As with paging control 308, the use of levels has the dual benefit of providing a better user interface to navigate a knowledge graph and reducing the computational power needed to present an entire graph if just a few levels are requested.

To generate visual graph 304, a graph database query language such as SPARQL Protocol and RDF Query Language (SPARQL) may be used to retrieve all subclasses of a concept object, such as:

```
select ?subclass where {
    ?subclass rdfs:subClassOf* :a
}
```

If multiple levels are used, the query may be repeated for each subclass. SPARQL may also be used to retrieve the depth (e.g., the number of respective subclasses of the results) of any returned classes. Visual graph 304 provides node definition functionality when a user hovers over (e.g., places a cursor on) a displayed concept. For example, a pop-up window may be presented that includes various metadata about the concept such as the definition of the concept. The pop-up window may also include options to present other types of graphs for the concept such as data assets or a taxonomy graph.

Legacy data management systems often just used monolithic or siloed concept glossaries that were unconnected to other semantically related concepts. For example, in traditional systems, a national identification number may not be linked to any other ontologies or information systems. Thus, if information were retrieved for the concept, only the definition with respect to the glossary would be retrieved. In contrast, when using a model such as data model 100, visual graph 304's pop up window may include not just one definition, but a more wholistic view that includes definitions and relationships as they relate to other schemas (e.g., the California Consumer Privacy Act (CCPA)).

Visual graph 304 also provides a much more expansive view of a concept than would be permitted under traditional legacy systems. For example, a user may not know that a national identification number "identify as" a person in some instances. Furthermore, some of the sub elements are data elements with respect to the CCPA-information that would not be displayed or known in a siloed system. Additionally, the interactive nature of visual graph 304 permits rapid exploring of the different concepts. For example, a user may click on the person concept and a new graph may be generated with the person at the head and its constituent related concepts.

Figure 4:
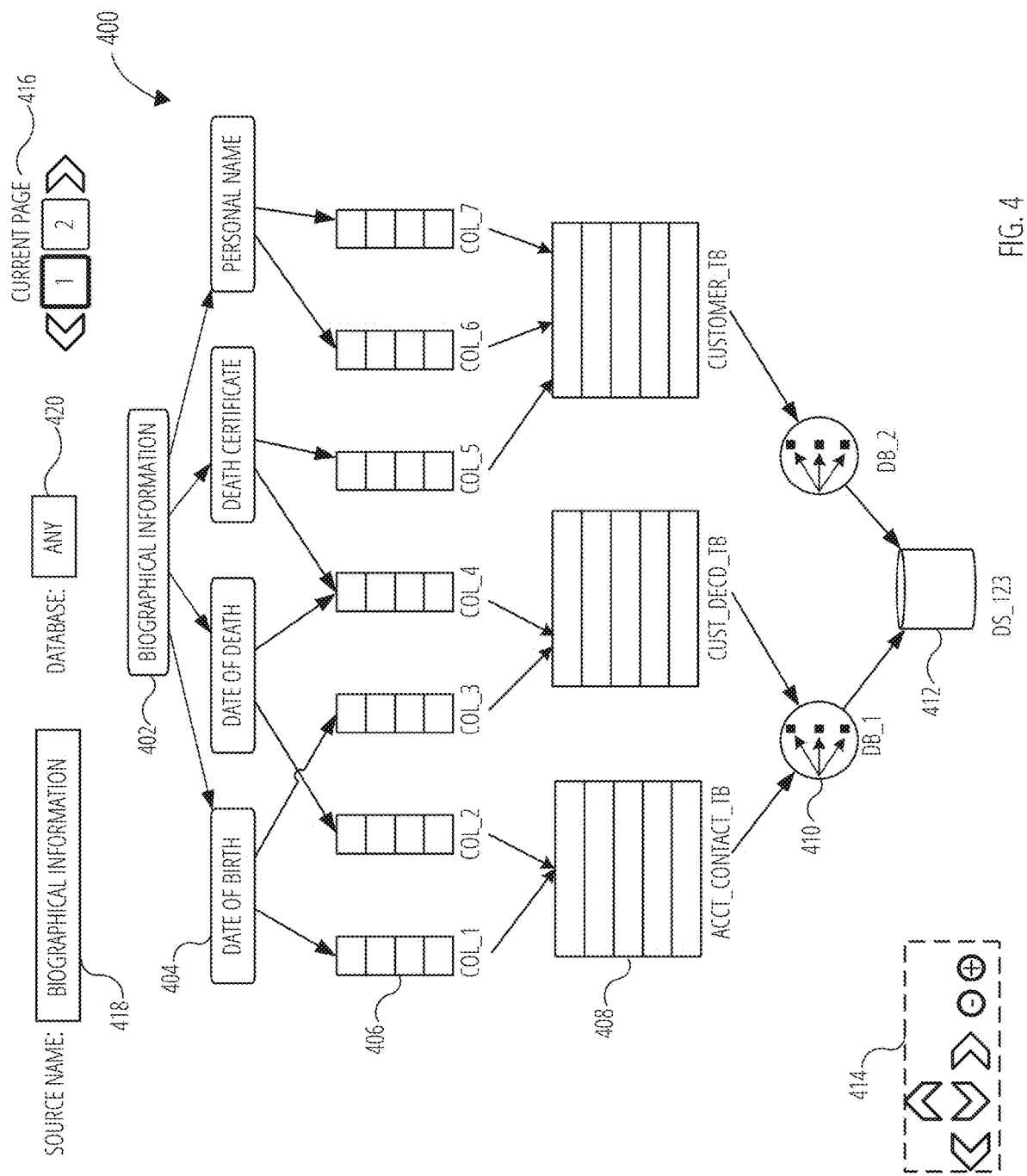
FIG. 4 is data asset visualization user interface, according to various examples.

As indicated previously, concepts may be explored in different manners. Once a user understands a concept, the user may want to look into where and how data for the concept is stored. FIG. 4 is data asset visualization user interface 400, according to various examples.

FIG. 4 is a data asset visualization user interface 400, according to various examples. User interface 400 includes a source name box 418, a database box 420, a paging control 416, a concept node 402, a subclass node 404, a column 406, a table 408, a schema 410, a data store 412, and navigation controls 414. Additionally, user interface elements may be part of a data asset visualization user interface such as visualization options, graph selection controls, etc., as described with respect to FIG. 3. Similarly, paging control 416 may be used to navigate around a presented graph as discussed previously. Source name 418 may be used to enter in a concept to be searched within one or more data sources as selected by database box 420. In various example, the data in source name box 418 may be pre-entered based on a user selection of a data asset graph type in graph selection controls 312.

Data asset visualization user interface includes four levels of data assets below concept node 408 and the sub-class level: (1) a column level, including column 406, (2) a table level, including table 408; (3) a schema level including schema 410; and (4) a data store level, including data store 412. Within the context of FIG. 4, a data store may represent the logical grouping of data implemented by an organization for one or more schemas (e.g., a database). For example, data store 412 may represent a labeled and logically addressable set of data that includes schema 410. Data store 412 may also store data from other schemas that are not illustrated-due to the schemas not including any columns associated with the concept "national identification number." Data store 412 may be part of data store 226 in various examples.

Generating data asset visualization user interface 400 may include querying one or more of data assets inventory knowledge bases (e.g., knowledge graph 232), data store 226, and ontology databases that identify the underlying data assets for an ontological concept. For example, knowledge graph server 202 may query a mapping stored in a data assets inventory knowledge base that identifies relational database column identifiers (e.g., "COL_1" of column 406) for a concept entered into source name box 418.

Results of the query may also include the parent assets of the columns such as the table name, the database name, and data store associated with the columns. In some examples, the parent assets may be retrieved by querying a database with the column names. In various examples, a tree-style visualization of data connections between the data assets and ontology may be generated based on the retrieved data. The columns, tables, databases, and data stores may be the nodes and the vertices the relationships between the nodes. Different icons may be used for each type (e.g., column, table, etc.) of data asset.

Figures 5A, 5B:
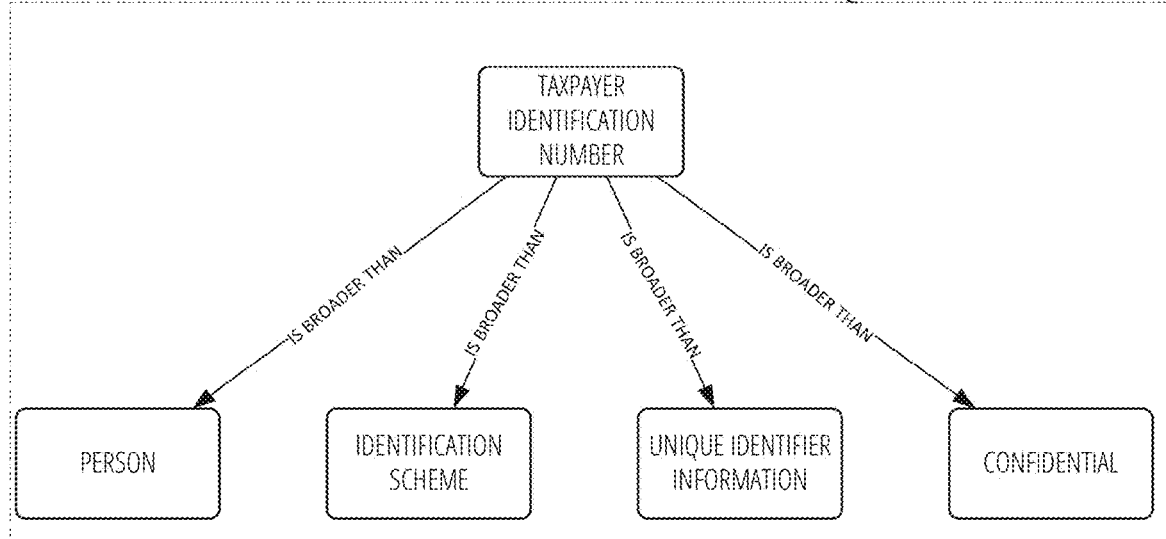
FIG. 5A illustrates a lexical and semantic searching interface, according to various examples.
FIG. 5B illustrates a lexical and semantic searching interface, according to various examples.

FIG. 5A illustrates a lexical and semantic searching interface, according to various examples. FIG. 5A includes input portion 502, an execute search element 504, and search suggestions 506. Without a semantic search model—but instead string matching—a user searching for "taxpayer identification number" would receive an incomplete list of results. For example, the results may include column names that start with "tax" but would not include a column labeled "Social_Security_NBR" because there are no overlapping characters.

The process of generating search suggestions 506 may involve multiple operations using one or more machine learning models. For example, one part may be a lexical correction (such as a spell check), and a second part may involve finding semantically adjacent concepts that match a user search input. The search input may include multiple words that may be individually tokenized and have correction applied to them individually in an attempt to find direct matches.

The process may be iterative in the sense that multiple possible search inputs may result from performing the spell-checking process. For example, a misspelled word, when run through a spell checker, will often result in multiple possible corrections. Each of these corrections may be used when performing the semantic search part of the search suggestion process.

Using the example illustrated in FIG. 5A, a user may enter "taxdpar identification numbrt" into input portion 502. Due to the misspelling, the search term would not result in any matches without some form of correction. A lexical correction (spelling errors) may result in a number of corrections with at least one being "taxpayer identification number." As is stands, because there were no direct matches to the misspelled concept, results portion shows "not found" but provides a number of user selectable concepts in search suggestions 506 resulting from the lexical and semantic suggestions.

As illustrated, the displayed selectable search suggestions 506 do not only include a concept based on a lexical correction of the search input—the taxpayer identification number—but concepts that are semantically related to the search input. Thus, search suggestions 506 are a blend of a lexical and semantic search. For instance, FIG. 5A also shows selectable concepts that include "card identification number", "bank identification number", "issuer identification number", "national identification number, and "employer identification number".

The semantic search uses knowledge graph embeddings to find semantically linked concepts in a vector space. Thus, a cosign similarity calculation may be used to find the closest related concepts to the searched input. In some examples, the most closely related concepts are actually the same concept, but just spelled differently. While in one example a cosign similarity calculation is executed to find the closest related concepts, in various other examples other algorithms and calculations may be performed to find the closest related concepts.

In various examples, an API call may be made to a search service that includes the knowledge graph embeddings. In response to the API call the service may return the 10 closest—within the vector space—concepts for a search. In other examples, any number of closest concepts may be provided. For instance, the number of returned concepts may be predetermined, and/or based on the number of related concepts.

FIG. 5B illustrates a lexical and semantic searching interface, according to various examples. A user may select one of the search suggestions presented in search suggestions 506. Upon receiving the selection, input portion 502 may be updated to display the selected search (shown in FIG. 5B as "taxpayer identification number"). After the user selects the execute search element 504, a query may be made to the graph database (e.g., as stored in data store 226) to retrieve a number of results dependent on the visualization options selected by the user.

Figure 6:
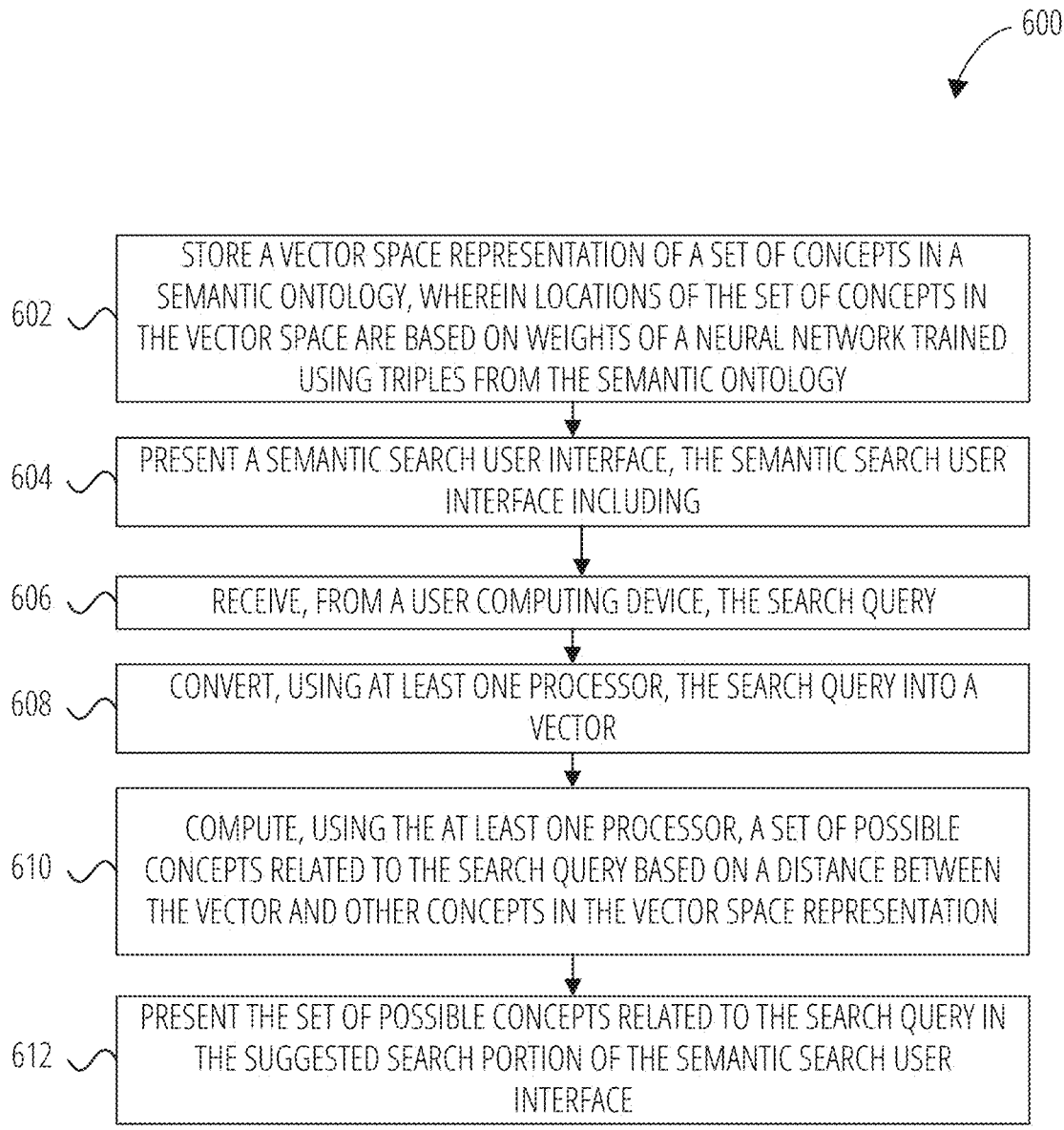
FIG. 6 illustrates a method in accordance with various examples.

FIG. 6 is a flowchart illustrating a method 600 to present search suggestions to a user. Method 600 is presented as a set of blocks, each of which indicates an operation of method 600. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 6. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure. In various examples, method 600 is performed using an architecture such as depicted in FIG. 2.

In operation 602, method 600 stores a vector space representation of a set of concepts in a semantic ontology, wherein locations of the set of concepts in the vector space are based on weights of a neural network trained using triples from the semantic ontology. Further description of the neural network is found herein, for instance, at least with respect to FIG. 12. In various examples, a second neural network may be used such as described with respect machine learning models 214 that is trained using metadata of a semantic ontology. The weights from the second neural network may be used to find the closest synonymous concept in the semantic ontology should a search query not have a direct match.

In operation 604, method 600 presents a semantic search user interface, the semantic search user interface including a text input portion to receive a search query from an input device, a suggested search portion, and a search results portion. In various examples, operation 604 is performed using user interface generation component 222 and is arranged as depicted in FIG. 5A and FIG. 5B.

In operation 606, method 600 receives, from a user computing device, the search query. The search query may include one or more words.

In operation 608, method 600 converts, using at least one processor, the search query into a vector. In various example, converting may include matching the search query to a concept in the semantic ontology. Then, the method may include performing a lookup in an index for the concept to retrieve the vector. For example, the index may be a record of all the vectors (e.g., a location in the vector space representation) for each concept in the semantic ontology as determined by weights of the neural network.

In various examples, the search query may include one or more misspelled words. Before matching, the spelling of one or more words may be corrected. Correction may be performed using various methodologies without departing from the scope of this disclosure. For example, a candidate model may include the concepts in the semantic ontology as potentially correct terms. The selection criteria for a misspelled word may be having less than a threshold number of operations (adding, substituting, moving, or deleting a character) needed to convert one word to a candidate word.

In operation 610, method 600 computes, using the at least one processor, a set of possible concepts related to the search query based on a distance between the vector and other concepts in the vector space representation. In some instances, the set of possible concepts may include a direct match as well as suggested possible concepts. Accordingly, even though there may be a direct match in the semantic ontology, search results may not be immediately retrieved. Instead, the direct match along with the other possible concepts may be presented (e.g., operation 612) and a confirmatory selection may be made by the user before presenting any results.

In various examples, computing the set of possible concepts related to the search query may include calculating cosign similarity values between the vector and respective vectors of the other concepts. The set of possible concepts may be limited to the 10 closest (or other chosen value) to not overload the user with possible matches.

In operation 612, method 600 presents the set of possible concepts related to the search query in the suggested search portion of the semantic search user interface. Each of the concepts in the set of possible concepts may be a user selectable element.

Method 600 may further include receiving a selection, from the user device, of a selection of a concept in the set of possible concepts. In response to receiving the selection, a query to a graph database may be executed to retrieve concepts semantically linked to the concept. For example, concepts semantically linked to the concept may include properties of the concept and data assets storing data associated with the concept such as depicted in FIG. 3, FIG. 4, and FIG. 5B. The concepts semantically linked to the concept may be presented in the search results portion of the semantic search user interface. The search results portion may also include visualization options such as depicted in FIG. 3.

Figure 7:
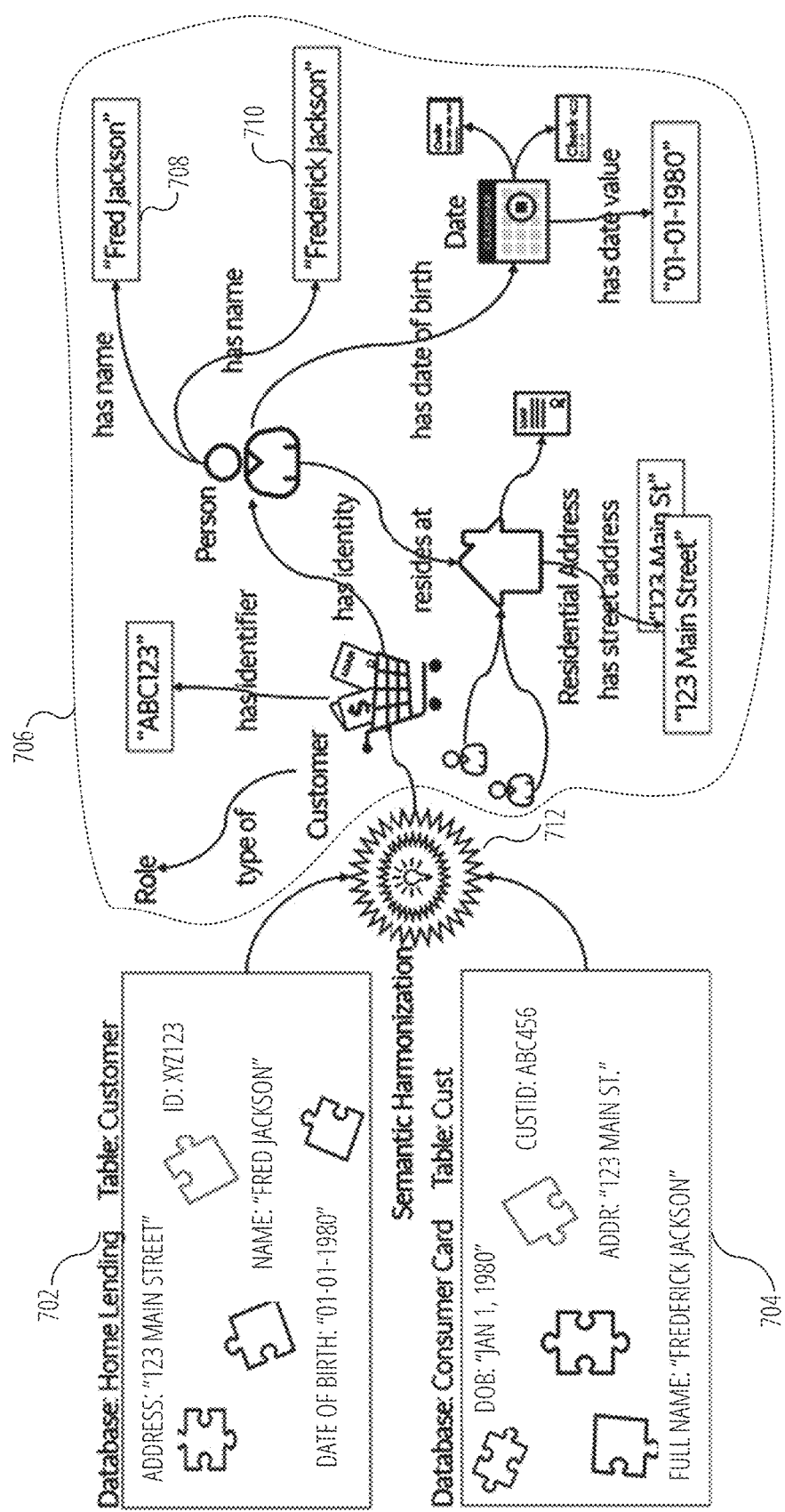
FIG. 7 is a pictorial representation of an overview of the result of semantic harmonization of two entities, according to various examples.
Figure 8:
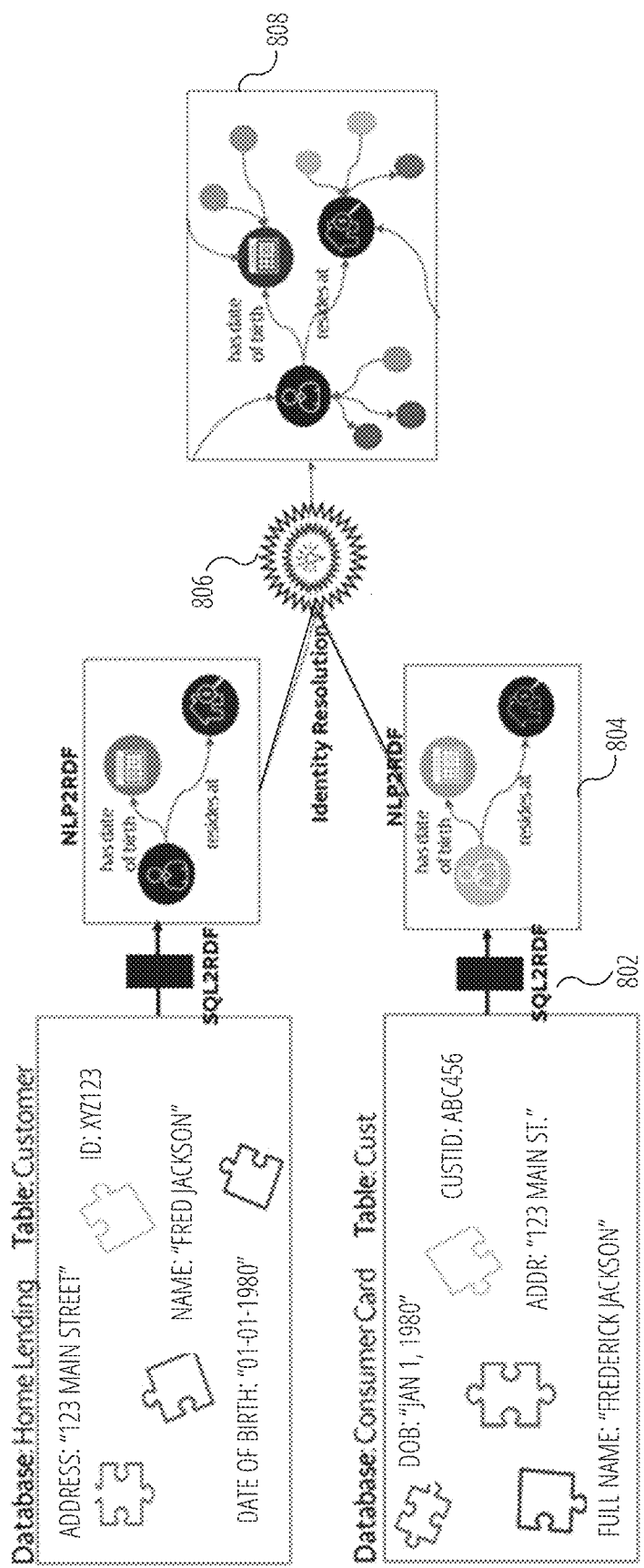
FIG. 8 is an expanded pictorial representation of a semantic harmonization process, according to various examples.
Figure 9:
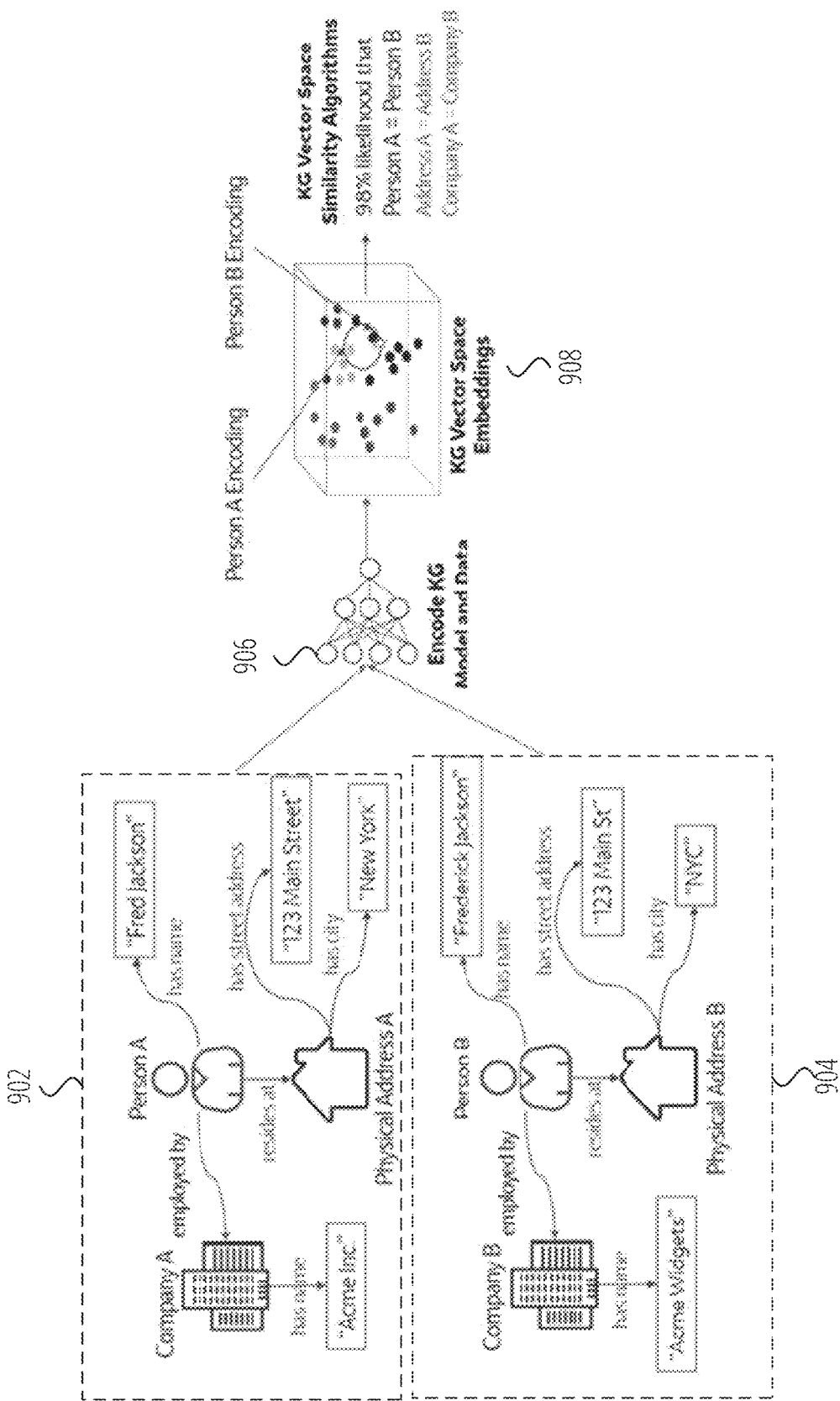
FIG. 9 is a pictorial representation of a data duplication process, according to various examples.
Figure 10:
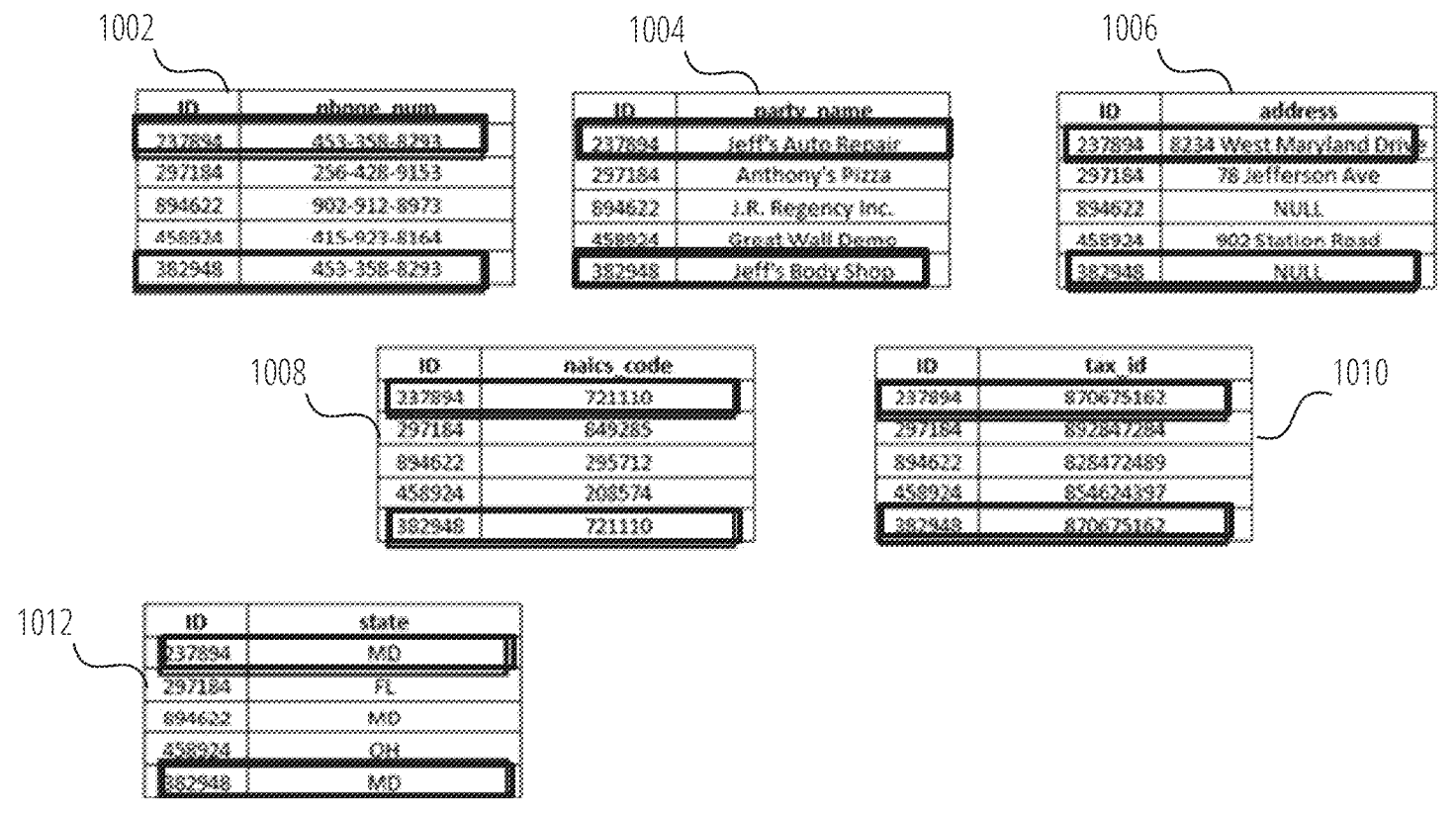
Figure 11:
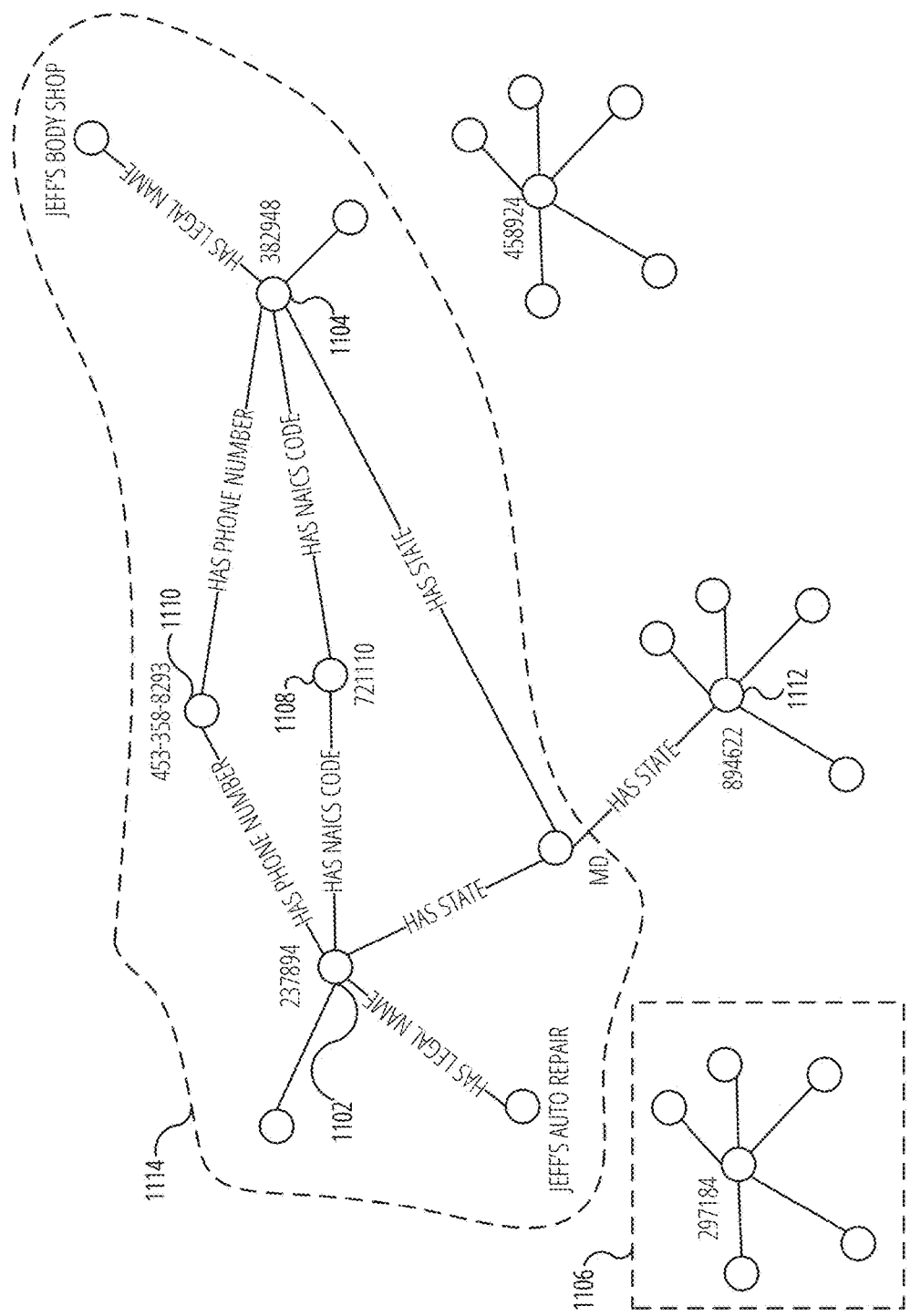
FIG. 11 is a visual depicture of the data in a graph database, according to various examples.
Figure 12:
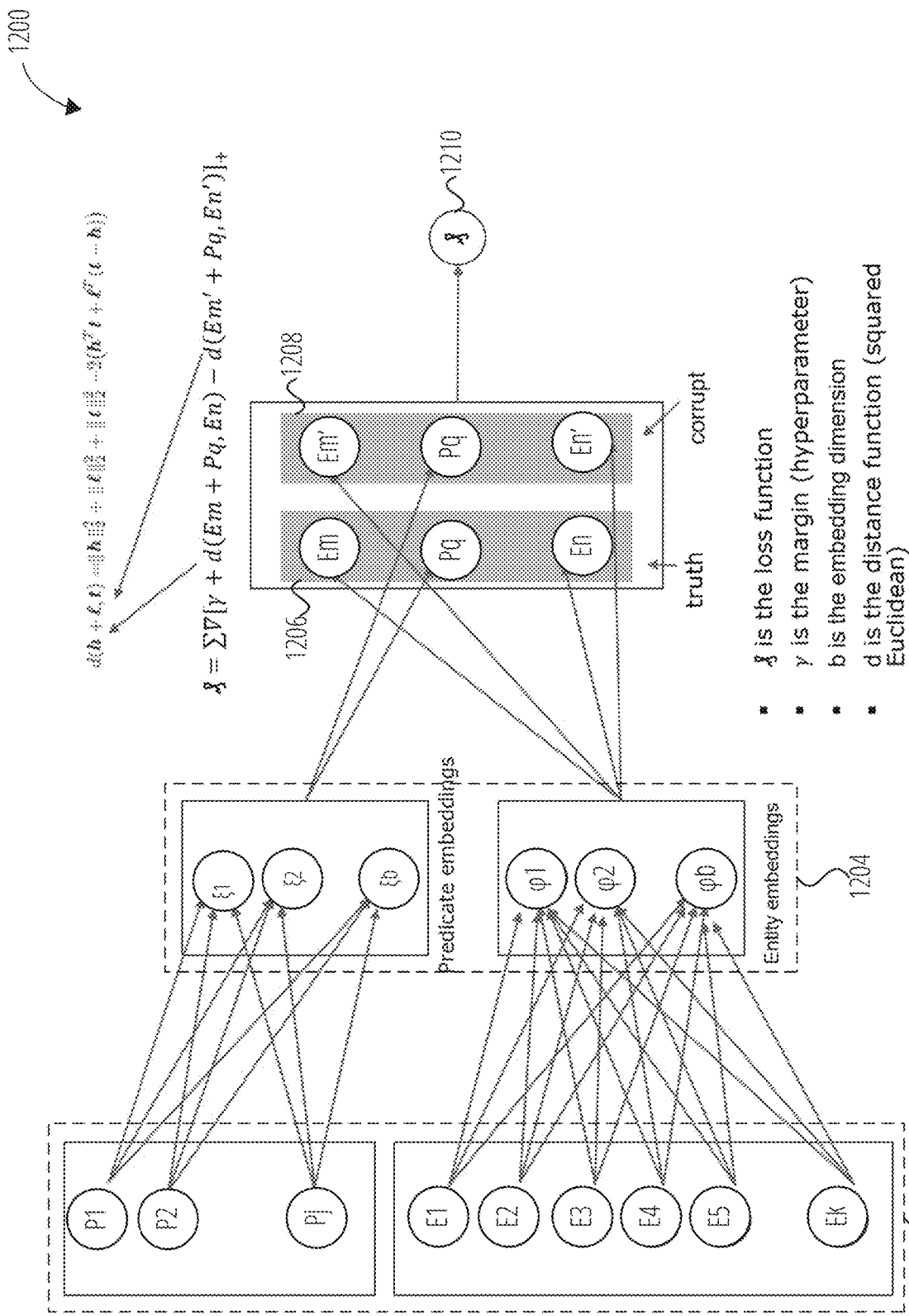
FIG. 12 illustrates a neural network architecture for encoding knowledge graphs, according to various examples.

FIGS. 7-12 provide a variety of views of a transformation of data in a relational database to a knowledge graph and/or low-dimensional vector space. For example, FIG. 7 is a pictorial representation of an overview of the result of semantic harmonization of two entities into a knowledge graph, according to various examples. FIG. 8 expands on the overview with an illustration of transforming the data in the relational database into an RDF format before the harmonization. FIG. 9 illustrates encoding the knowledge graph representations (e.g., the RDF formats) into a vector format for data duplication purposes. FIG. 10 illustrates a table view of the pictorially represented data of FIG. 7. FIG. 11 illustrates the knowledge graph output after a process as depicted in FIG. 7 using the tables from FIG. 11. Finally, FIG. 12 illustrates a neural network that may be used by encoding process of FIG. 9.

As discussed previously, even once data is ingested and put into a graph database there are often duplicates due to typos, lack of harmonization, etc. FIG. 7 is a pictorial representation of an overview of the result of semantic harmonization of two entities, according to various examples. FIG. 7 includes a first entity 702, a second entity 704, and a pictorial graph representation 706 of a result of a semantic harmonization process 712, and name value 710. The labels within first entity 702 and second entity 704 may represent column names in respective databases and tables.

For example, first entity 702 includes an "Address" label with a value of "123 Main Street", whereas second entity 704 has an "Addr" label with a value of "123 Main St". Despite the underlying data appearing to both refer to the same address, not only are the column names different, but so is the format of the address. First entity 702 and second entity 704 show a similar discrepancy with respect to birthdates. First entity 702 includes a column with "Date of Birth" and uses a "xxxx-xxxx" format, whereas second entity 704 uses "DOB" and a "written month, day, year" format.

Knowledge graph representation 706 is the result of taking the legacy data from first entity 702 and second entity 704 and applying a semantic harmonization process 712. Knowledge graph representation 706 is created using a common data model. A first-class object (e.g., an actual entity, as opposed to a string) may be created that is then associated with the attributes from the first entity 702 and second entity 704. Using the semantic harmonization process 712, what used to take complex table joins may now be performed using pre-wired data linkages, as discussed in further detail below. Label 708 of "Fred Jackson" represents the knowledge graph representation of the name "Fred Jackson" from first entity 702 whereas label 710 "Frederick Jackson" represents the Full Name "Frederick Jackson" from second entity 704.

FIG. 8 is an expanded pictorial representation of a semantic harmonization process (e.g., semantic harmonization process 712 of FIG. 7) according to various examples. FIG. 8 includes a Structured Query Language to Resource Description Framework (SQL-to-RDF) conversion 802, intermediate graph 804, Knowledge Graph Mapping Language (KGML)-to-RDF conversion 806, and a curated graph 808.

SQL-to-RDF conversion 802 is a process that takes data from relational database tables and converts it into triples according to a resource description framework (RDF) that may represent a knowledge graph. However, simply changing into an RDF format does not solve the underlying issue of deduplication (i.e., reduction to a single common object). The KGML-to-RDF conversion 806 does precisely that to generate curated graph 808. This process is depicted visually, and described further, with respect to FIGS. 10 and 11.

The SQL-to-RDF conversion 802 may use Relational Database to Resource Description Framework Mapping (R2RML). One purpose of R2RML is to facilitate a map of existing relational data—as encapsulated in one or more databases—to an RDF data model (e.g., a knowledge graph). The input for an R2RML mapping is a logical table that may be a base table, a view, or a valid SQL query. The output of the R2RML is a mapping of the logical table to an RDF using a triple map. A triple map is a rule that takes each row in one of the logical tables to an RDF triple. The rule may have two components, the subject map and a multiple predicate-object map, which may be made up of predicate maps and object maps. The triple for a given database row may be formulated by combining the subject map with a predicate map and an object map.

FIG. 9 is a pictorial representation of a data duplication process (e.g., KGML-to-RDF conversion 806), according to various examples. As illustrated, FIG. 9 includes two knowledge graphs—knowledge graph 902 and knowledge graph 904—each corresponding to respective entities (e.g., Persons, Physical Addresses) and values for the entities. For example, knowledge graph 902 has "Company A" with a "has name" value of "Acme, Inc." In various examples, knowledge graph 902 and knowledge graph 904 are generated using an SQL-to-RDF process such as R2RML.

After the knowledge graphs are generated, they may be fed into encoding process 906 (further discussed with respect to at least FIG. 12) that generates vector space representation 908. Once vector space representation 908 has been generated, similarity searches may be run using the vector space.

The benefits of an approach such as described above are at least three-fold. First, there is a reduction in costs and latencies of human intervention and software development. Second, it is a simpler explanation of algorithms for human users. And, third, it becomes a building block for improved machine learning for other uses cases such as customer analytics because knowing that two customers are actually the same customer results in more knowledge about a customer to begin with. Similarly, if duplicates are left in when performing analytics, the results may be skewed based on which customer has the most duplicates, as opposed to any real underlying data.

FIG. 10 and FIG. 11 present illustrations corresponding to an example process of taking tables from a RDBMS and converting them to a set of knowledge graphs. FIG. 10 is a depiction of a set of tables in an RDBMS, according to various examples. FIG. 10 includes table 1002 through table 1012.

As discussed above, one of the problems in finding duplicated data is that the data may exist in multiple flat tables. For instance, these tables may have two columns, one with an identifier and another with a property. For purposes of explanation, table 1002 is shown as including a column for "ID" and a column for phone number "phone_num". Table 1004 is shown as including a column for "ID" and "party name". Table 1006 is shown as including a column for "ID" and "address". Table 1008 is shown as including a column for "ID" and "naics_code". Table 1010 is shown as including a column for "ID" and "tax id". Table 1012 is shown as including a column for "ID" and "state". As can be seen in FIG. 10, Table 1002 has two different IDs (highlighted by a bold outline) for the phone number 452-358-8293 (illustrated as IDs 237894 and 382948, respectively). Similar duplicated data is illustrated in Tables 1006, 1008, 1010, and 1012.

To aggregate the data, SQL queries that match using the identifier and fuzzy string matching may be employed to find data across the tables. However, as previously discussed herein, a challenge arises when there is inaccurate or missing data in one or more of the tables. Because of the disparate tables it may be difficult to determine if two identifiers should be merged (e.g., despite having different identifiers, because the identifiers in fact represent the same entity). Using flat tables (e.g., as shown in FIG. 10), determining if two entities (e.g., IDs) should be merged into one entity is a time consuming and bespoke process that is dependent on the layout and number of tables.

FIG. 11 is a visual depiction of the data of the tables illustrated in FIG. 10 in a graph database format, according to various examples described herein. The data may be the result of an SQL-to-RDF conversion of the tables depicted in FIG. 10. As discussed herein, conversion can lead to a graph in which the relationships and attributes of the data can easily be discovered. FIG. 11 includes node 1102, node 1104, graph section 1106, node 1108, node 1110, node 1112, and graph section 1114. As illustrated, the graph need not be fully connected. For example, graph section 1106 is not connected to graph section 1114.

For example, in FIG. 11, node 1102 and node 1104 have different identifiers (237894 and 382948, respectively). At a glance, it seems that the two nodes are likely the same entity because they share a common North American Industry Classification System (NAICS) code (node 1108), phone number (node 1110), and have a similar legal name However, even the graph sections presented in FIG. 11 require advanced graph queries to retrieve and present as the data may not exist in a single data source. One goal of the semantic harmonization process discussed herein is to abstract graph query technology (e.g., SPARQL) to make it available to non-database programmer experts to search and explore.

FIG. 12 illustrates a neural network architecture 1200 for encoding knowledge graphs, according to various examples.

The encoding architecture may be an implementation of encoding process 906 of FIG. 9. FIG. 12 includes input layer 1202, hidden layer 1204, truth triple 1206, corrupt triple 1208, and loss function 1210. By taking the graph representations and inputting them through neural network architecture 1200 one can obtain a low-dimensional vector space representation that is fast and easily understandable to query for duplicates.

In various examples, the input layer 1202 takes an input of head nodes, relational node, and tail nodes from the knowledge graphs (e.g., the knowledge graph illustrated in FIG. 11). A graph may be represented as a tensor-a three-dimensional matrix where each entry is a 1 if that triple exists, and otherwise is a 0. The input may be formatted in a one-hot encoding manner according to an index of [predicate 1, predicate 2, predicate n, . . . entity 1, entity 2, entity n]. Thus, predicate 1 may be linked to "has address", predicate 2 may be "has phone number", entity 2 may be "Jeff's Auto Body Shop", and entity 5 may be the phone number for Jeff's Auto Body Shop. Then, the format for an input triple of "Jeff's Autobody Shop has phone number 555-123-1234" may be [0, 1, 0 . . . {beginning of entities} 0, 1, 0, 0, 1].

The loss function 1210 may be a distance comparison between a truth triple 1206 and a generated corrupt triple 1208. A truth triple may be a triple from the input knowledge graphs. A corrupt triple may be a triple that is unlikely to be true (and therefore not in the knowledge graphs). Continuing the example from above, a corrupt triple may be "Jeff's Autobody Shop has a birth date of Nov. 1, 2021." In this case, a business entity will not have a birth date since only a living thing can have a birthdate. A business entity may instead have a date of incorporation or formation. Accordingly, a corrupt triple may be a triple in which an entity has a property that logically does not make sense given the type of entity. Then the loss may be computed according to loss function 1210 and, through backpropagation, the weights of hidden layer 1204 may be updated.

In addition to the triples from the knowledge graphs, training data may include historical merge data between entities. For example, an added property may be "has a merge party" that indicates whether or not a particular entity was merged with another entity. This data allows the neural network to pick up on the inferences that may indicate a merge. Furthermore, as users merge entities or indicate two entities should not be merged, the neural network may become even more accurate through reinforcement learning.

After the training, the last layer of the neural network may be discarded and the weights in the predicate and entity embeddings (e.g., hidden layer 1204) may be used as the coordinates for the triples. The closer (e.g., using Euclidian or cosign similarity) two triples are the more likely the two entities should be merged or are closely related.

The resulting data may be accessed via an API that lets users do a similarity search. For example, given one embedding for an entity (e.g., Jeff's Auto Shop) with predicate (e.g., has a merge party) with another entity, the prediction should indicate a high likelihood if the parties should be merged. The API may further permit the user to confirm a merge or indicate a merge does not exist, which may be used to update the neural network.

In another example, the resulting embeddings may be used to find entities most similar (e.g., closest in vector space) to a search query. A user may then select one of the search results to explore the knowledge graph surrounding the entity in more detail-all without needing to know any complex graph queries.

Figure 13:
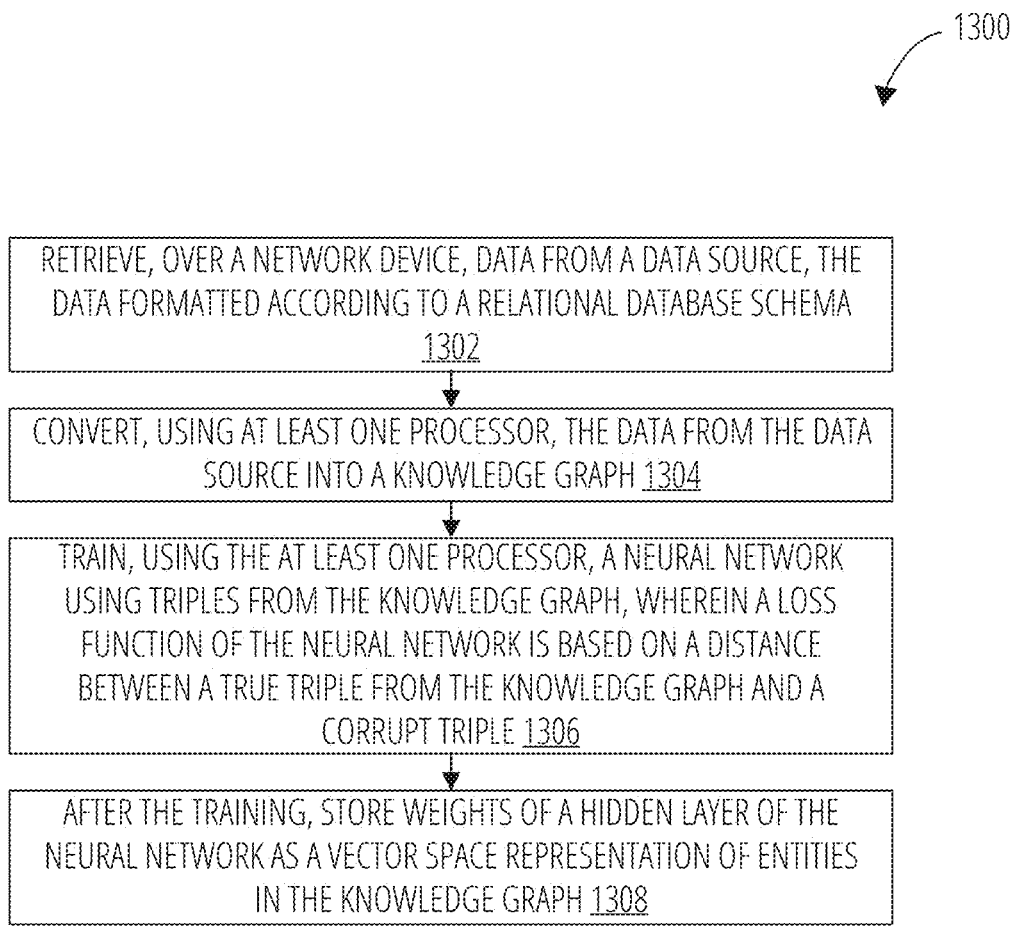
FIG. 13 illustrates a method, according to various examples.

FIG. 13 is a flowchart illustrating a method 1300 to train a neural network, according to various examples. Method 1300 is presented as a set of blocks, each of what indicates an operation of method 1300. The method may be embodied in a set of instructions stored in at least one computer-readable storage device of a computing device(s). A computer-readable storage device excludes transitory signals. In contrast, a signal-bearing medium may include such transitory signals. A machine-readable medium may be a computer-readable storage device or a signal-bearing medium. The computing device(s) may have one or more processors that execute the set of instructions to configure the one or more processors to perform the operations illustrated in FIG. 13. The one or more processors may instruct other component of the computing device(s) to carry out the set of instructions. For example, the computing device may instruct a network device to transmit data to another computing device or the computing device may provide data over a display interface to present a user interface. In some examples, performance of the method may be split across multiple computing devices using a shared computing infrastructure. In various examples, method 13000 is performed using an architecture such as depicted in FIG. 2 (e.g., machine learning training component 234) and in accordance with the discussion of FIG. 7 through FIG. 14.

In operation 1302, method 1300 includes retrieving, over a network device, data from a data source, the data formatted according to a relational database schema. For example, the data sources may be data source 228 and data source 230 that contain customer and business entity information.

In operation 1304, method 1300 includes converting, using at least one processor, the data from the data source into a knowledge graph. As discussed in more detail above, the data may be converted using SQL-to-RDF conversion 802 process that results in a set of triples formatted according to a semantic ontology.

In operation 1306, method 1300 includes training, using the at least one processor, a neural network using triples from the knowledge graph, wherein a loss function of the neural network is based on a distance between a true triple from the knowledge graph and a corrupt triple. A true triple (e.g., a truth triple) is a triple that exists in the knowledge graph and a corrupt triple is a triple that does not exist in the knowledge graph. Corrupt triples may be automatically generated. The knowledge graph may be traversed to obtain each of the true triples for inputting into the neural network In various examples, a true triple is formatted according to an entity, predicate, entity format using an index of entities and predicates. For example, a one-dimensional vector may be used as an input format to the neural network where each position in the vector is indexed to an entity (e.g., a customer, business, phone number, address) or predicate (e.g., has phone number, has address).

The neural network may be further trained using past entity merge data. The past entity merge data includes triples with an entity and a merge property predicate. For example, a triple may be "Entity A has merge party Entity B." The past entity merge data may be retrieved from a data source.

In operation 1308, after the training, the method 1300 includes storing weights of a hidden layer of the neural network as a vector space representation of entities in the knowledge graph.

Method 1300 may further include presenting a search user interface to a user, the search user interface including an input portion to receive a search query and receiving the search query. Then, method 1300 may include determining, using the at least one processor, a set of entities that match the search query based on the vector space representation and presenting the set of entities to the user in the search user interface. The entities may be determined by calculating the distance between entities in the vector space representation. For example, if the search query was "Bob's Auto Shop", the coordinates in the vector space representation for the entity "Bob's Auto Shop" may be retrieved. Then, entities with a certain distance of Bob's Auto Shop in the vector space representation may presented as possible search results, in addition to Bob's Auto Shop.

Method 1300 may further include receiving a selection of a first entity from the set of entities and based on receiving the selection, presenting a knowledge graph of the first entity.

Figure 14:
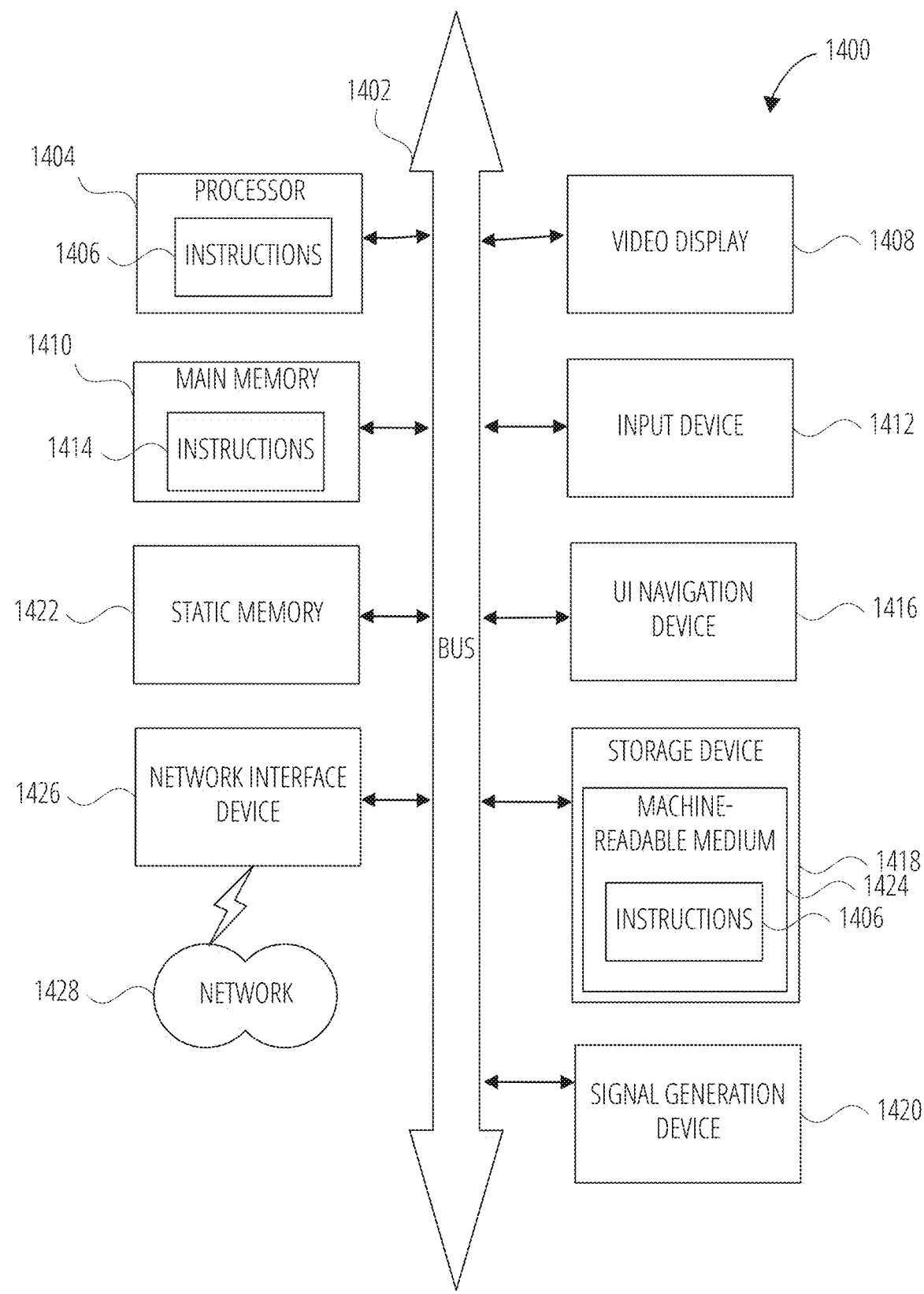
FIG. 14 is a block diagram illustrating a machine in the example form of computer system, within which a set or sequence of instructions may be executed to cause the machine to perform any one of the methodologies discussed herein, according to various examples.

FIG. 14 is a block diagram illustrating a machine in the example form of computer system 1400, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client Network environments, or it may act as a peer machine in peer-to-peer (or distributed) Network environments. The machine may be an onboard vehicle system, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 1400 includes at least one processor 1404 (e.g., a central processing unit (CPU), a graphics processing unit (GPU) or both, processor cores, compute nodes, etc.), a main memory 1410 and a static memory 1422, which communicate with each other via a bus 1402. The computer system 1400 may further include a video display 1408, an input device 1412 (e.g., a keyboard), and a user interface (UI) navigation device 114 (e.g., a mouse). In one embodiment, the video display 1408, input device 1412, and UI navigation device 1416 are incorporated into a single device housing such as a touch screen display. The computer system 1400 may additionally include a storage device 1418 (e.g., a drive unit), a signal generation device 1420 (e.g., a speaker), a network interface device 1426, and one or more sensors (not shown), such as a global positioning system (GPS) sensor, compass, accelerometer, or other sensors.

The storage device 1418 includes a machine-readable medium 1424 on which is stored one or more sets of data structures and instructions 1414 (e.g., software) embodying or utilized by any one or more of the methodologies or functions described herein. The instructions 1414 may also reside, completely or at least partially, within the main memory 1410, static memory 1422, and/or within the processor 1404 during execution thereof by the computer system 100, with the main memory 1410, static memory 1422, and the processor 1404 also constituting machine-readable media.

While the machine-readable medium 1424 is illustrated in an example embodiment to be a single medium, the term "machine-readable medium" may include a single medium or multiple media (e.g., a centralized or distributed Database, and/or associated caches and servers) that store the one or more instructions 1414. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. A computer-readable storage device may be a machine-readable medium 1424 that excluded transitory signals.

The instructions 1414 may further be transmitted or received over a communications Network 126 using a transmission medium via the network interface device 1426 utilizing any one of a number of well-known transfer protocols (e.g., HTTP). Examples of communication networks include a local area Network (LAN), a wide area Network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

What is claimed is:

1. A method comprising:
   presenting a semantic search user interface, the semantic search user interface including:
   a text input portion to receive a search query;
   a suggested search portion; and
   a search results portion;
   receiving, from a user computing device, the search query;

computing a set of semantically close concepts related to the search query using triples from a semantic ontology;
presenting the set of semantically close concepts related to the search query in the suggested search portion of the semantic search user interface;
receiving, from the user computing device, a selection of a concept in the set of semantically close concepts;
in response to receiving the selection, executing a query to a graph database to retrieve concepts semantically linked to the concept in the semantic ontology; and
presenting the concepts semantically linked to the concept in the search results portion of the semantic search user interface.

2. The method of claim 1, wherein presenting the concepts semantically linked to the concept in the search results portion of the semantic search user interface includes:
presenting the concept in the semantic ontology as a node on a graph linked to other nodes, the other nodes based on the concepts semantically linked to the concept in the semantic ontology.

3. The method of claim 2, wherein the semantic search user interface includes a level control configured to determine a number of subclasses of the concept to present in the search results portion of the semantic search user interface.

4. The method of claim 2, wherein edges between nodes presented in the search results portions of the semantic are labeled with predicate values of triples in the semantic ontology.

5. The method of claim 1, wherein computing the set of semantically close concepts related to the search query using triples from a semantic ontology includes:
executing a lexical correction operation to the search query that results in a modified search query.

6. The method of claim 5, further comprising:
determining that the modified search query is a direct match to a concept in the semantic ontology; and
based on the determining, presenting the concept in the semantic ontology with the set of semantically close concepts.

7. The method of claim 5, wherein the lexical correction operation is a spell check operation.

8. A non-transitory computer-readable medium comprising instructions, which when executed by a processing unit, configure the processing unit to perform operations comprising:
presenting a semantic search user interface, the semantic search user interface including:
a text input portion to receive a search query;
a suggested search portion; and
a search results portion;
receiving, from a user computing device, the search query;
computing a set of semantically close concepts related to the search query using triples from a semantic ontology;
presenting the set of semantically close concepts related to the search query in the suggested search portion of the semantic search user interface;
receiving, from the user computing device, a selection of a concept in the set of semantically close concepts;
in response to receiving the selection, executing a query to a graph database to retrieve concepts semantically linked to the concept in the semantic ontology; and
presenting the concepts semantically linked to the concept in the search results portion of the semantic search user interface.

9. The non-transitory computer-readable medium of claim 8, wherein presenting the concepts semantically linked to the concept in the search results portion of the semantic search user interface includes:
presenting the concept in the semantic ontology as a node on a graph linked to other nodes, the other nodes based on the concepts semantically linked to the concept in the semantic ontology.

10. The non-transitory computer-readable medium of claim 9, wherein the semantic search user interface includes a level control configured to determine a number of subclasses of the concept to present in the search results portion of the semantic search user interface.

11. The non-transitory computer-readable medium of claim 9, wherein edges between nodes presented in the search results portions of the semantic are labeled with predicate values of triples in the semantic ontology.

12. The non-transitory computer-readable medium of claim 8, wherein computing the set of semantically close concepts related to the search query using triples from a semantic ontology includes:
executing a lexical correction operation to the search query that results in a modified search query.

13. The non-transitory computer-readable medium of claim 12, wherein the instructions, which when executed by the processing unit, further configure the processing unit to perform operations comprising:
determining that the modified search query is a direct match to a concept in the semantic ontology; and
based on the determining, presenting the concept in the semantic ontology with the set of semantically close concepts.

14. The non-transitory computer-readable medium of claim 12, wherein the lexical correction operation is a spell check operation.

15. A system comprising:
a processing unit; and
a storage device comprising instructions, which when executed by the processing unit configure the processing unit to perform operations comprising:
presenting a semantic search user interface, the semantic search user interface including:
a text input portion to receive a search query;
a suggested search portion; and
a search results portion;
receiving, from a user computing device, the search query;
computing a set of semantically close concepts related to the search query using triples from a semantic ontology;
presenting the set of semantically close concepts related to the search query in the suggested search portion of the semantic search user interface;
receiving, from the user computing device, a selection of a concept in the set of semantically close concepts;
in response to receiving the selection, executing a query to a graph database to retrieve concepts semantically linked to the concept in the semantic ontology; and
presenting the concepts semantically linked to the concept in the search results portion of the semantic search user interface.

16. The system of claim 15, wherein presenting the concepts semantically linked to the concept in the search results portion of the semantic search user interface includes:

presenting the concept in the semantic ontology as a node on a graph linked to other nodes, the other nodes based on the concepts semantically linked to the concept in the semantic ontology.

17. The system of claim 16, wherein the semantic search user interface includes a level control configured to determine a number of subclasses of the concept to present in the search results portion of the semantic search user interface.

18. The system of claim 16, wherein edges between nodes presented in the search results portions of the semantic are labeled with predicate values of triples in the semantic ontology.

19. The system of claim 15, wherein computing the set of semantically close concepts related to the search query using triples from a semantic ontology includes:
  executing a lexical correction operation to the search query that results in a modified search query.

20. The system of claim 19, wherein the instructions, which when executed by the processing unit, further configure the processing unit to perform operations comprising:
  determining that the modified search query is a direct match to a concept in the semantic ontology; and
  based on the determining, presenting the concept in the semantic ontology with the set of semantically close concepts.

* * * * *